US008275207B2

(12) United States Patent
Okamoto et al.

(10) Patent No.: US 8,275,207 B2
(45) Date of Patent: Sep. 25, 2012

(54) DIGITAL SIGNAL ENCODING AND DECODING DEVICE AND METHOD

(75) Inventors: Kazuo Okamoto, Osaka (JP); Yuji Nagaishi, Osaka (JP); Tatsuro Juri, Osaka (JP)

(73) Assignee: Panasonic Corporation, Osaka (JP)

( * ) Notice: Subject to any disclaimer, the term of this patent is extended or adjusted under 35 U.S.C. 154(b) by 1281 days.

(21) Appl. No.: 11/996,705

(22) PCT Filed: Jul. 19, 2006

(86) PCT No.: PCT/JP2006/314265
§ 371 (c)(1),
(2), (4) Date: Jan. 24, 2008

(87) PCT Pub. No.: WO2007/013335
PCT Pub. Date: Feb. 1, 2007

(65) Prior Publication Data
US 2010/0142811 A1 Jun. 10, 2010

(30) Foreign Application Priority Data

Jul. 26, 2005 (JP) ................................ 2005-215785

(51) Int. Cl.
*G06K 9/36* (2006.01)
*G06K 9/46* (2006.01)
*G06K 9/00* (2006.01)
*H04B 1/66* (2006.01)
*H04N 7/12* (2006.01)
*H04N 11/02* (2006.01)
*H04N 11/04* (2006.01)

(52) U.S. Cl. ........ 382/232; 382/166; 382/233; 382/238; 382/251; 375/240.03

(58) Field of Classification Search .................. 382/166, 382/232, 233, 238, 251; 375/240.03
See application file for complete search history.

(56) References Cited

U.S. PATENT DOCUMENTS 4,710,812 A 12/1987 Murakami et al.
(Continued)

FOREIGN PATENT DOCUMENTS

JP 61-205093 9/1986
(Continued)

OTHER PUBLICATIONS

International Search Report issued Oct. 24, 2006 in the International (PCT) Application No. PCT/JP2006/314265.
(Continued)

*Primary Examiner* — Bernard Krasnic
(74) *Attorney, Agent, or Firm* — Wenderoth, Lind & Ponack, L.L.P.

(57) ABSTRACT

An encoding device includes: a difference generation unit for obtaining a first pixel difference value as a difference value between a first pixel value and a pixel value of a pixel having the same color as the first pixel positioned in the vicinity of the first pixel; a quantization width decision unit for deciding a quantization width in data generation by quantizing the first and the second pixel value according to the number of digits of an unsigned integer binary value of the first pixel difference value and the number of digits of an unsigned integer binary value of the second pixel difference value generated in the difference generation unit for the second pixel value of the second pixel; a quantization width information generation unit for generating quantization width information having a quantization width used for quantization/decoding of the first and the second pixel value; and a quantization unit for generating a first and a second compressed encoded pixel value of n-bit length.

25 Claims, 16 Drawing Sheets

U.S. PATENT DOCUMENTS

| | | | |
|---|---|---|---|
| 5,481,309 A * | 1/1996 | Juri et al. | 375/240.03 |
| 5,585,853 A * | 12/1996 | Juri et al. | 375/240.03 |
| 6,201,898 B1 | 3/2001 | Takeuchi et al. | |
| 6,282,364 B1 | 8/2001 | Takeuchi et al. | |
| 6,744,929 B1 | 6/2004 | Okada | |

FOREIGN PATENT DOCUMENTS

| | | |
|---|---|---|
| JP | 10-56638 | 2/1998 |
| JP | 11-341288 | 12/1999 |
| JP | 2000-244935 | 9/2000 |
| JP | 2003-259393 | 9/2003 |

OTHER PUBLICATIONS

Supplementary European Search Report issued Jul. 27, 2010 in Application No. EP 06 76 8291.

A. Bruna et al., "Predictive Differential Modulation for CFA compression", Signal Processing Symposium, 2004, Norsig 2004, Proceedings of the $6^{th}$ Nordic Espoo, Finland Jun. 9-11, 2004, Piscataway, NJ, USA, IEEE, Jun. 9, 2004, pp. 101-104.

International Preliminary Report on Patentability issued Feb. 7, 2008 in the International (PCT) Application No. PCT/JP2006/314265.

* cited by examiner

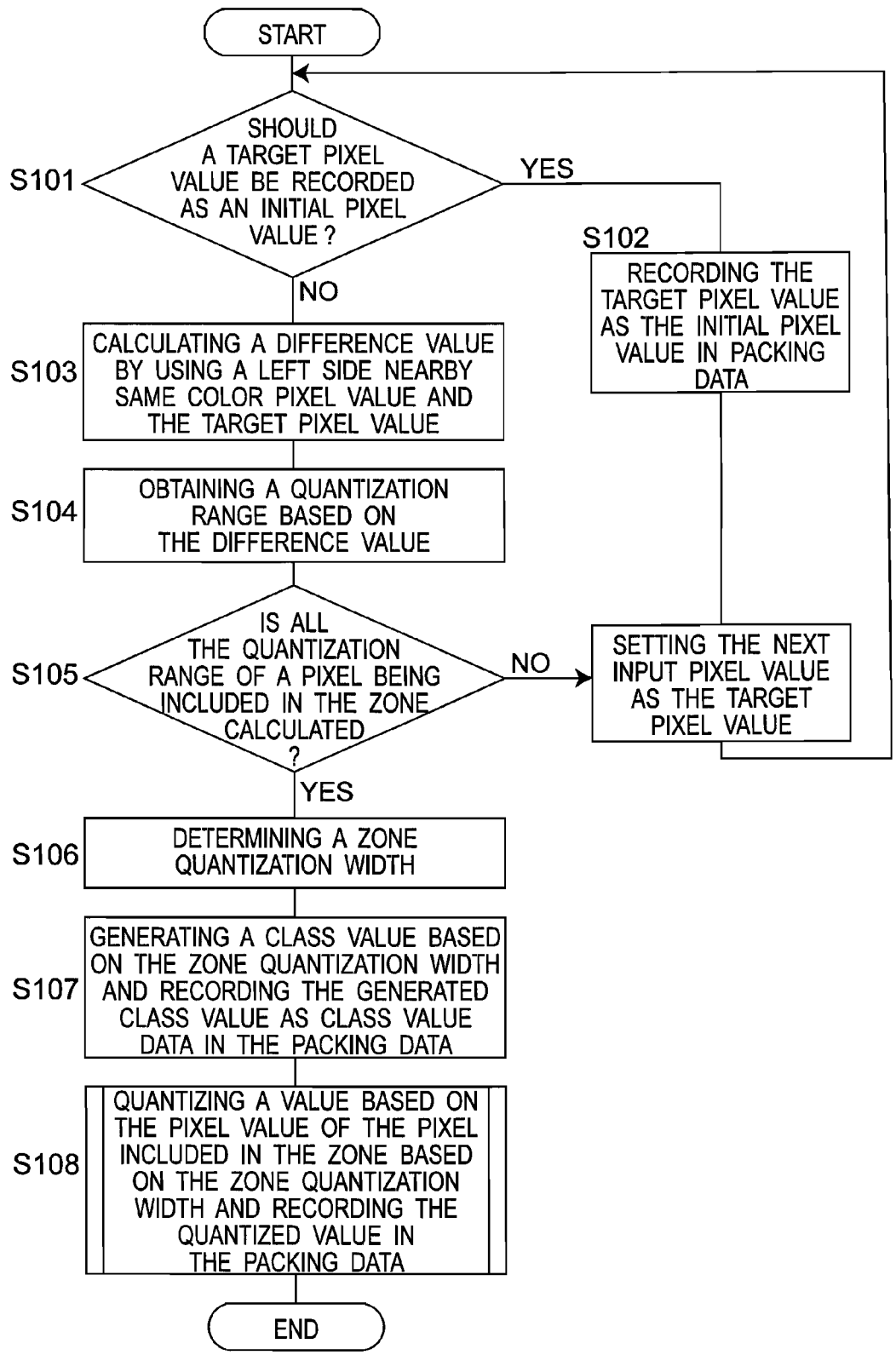

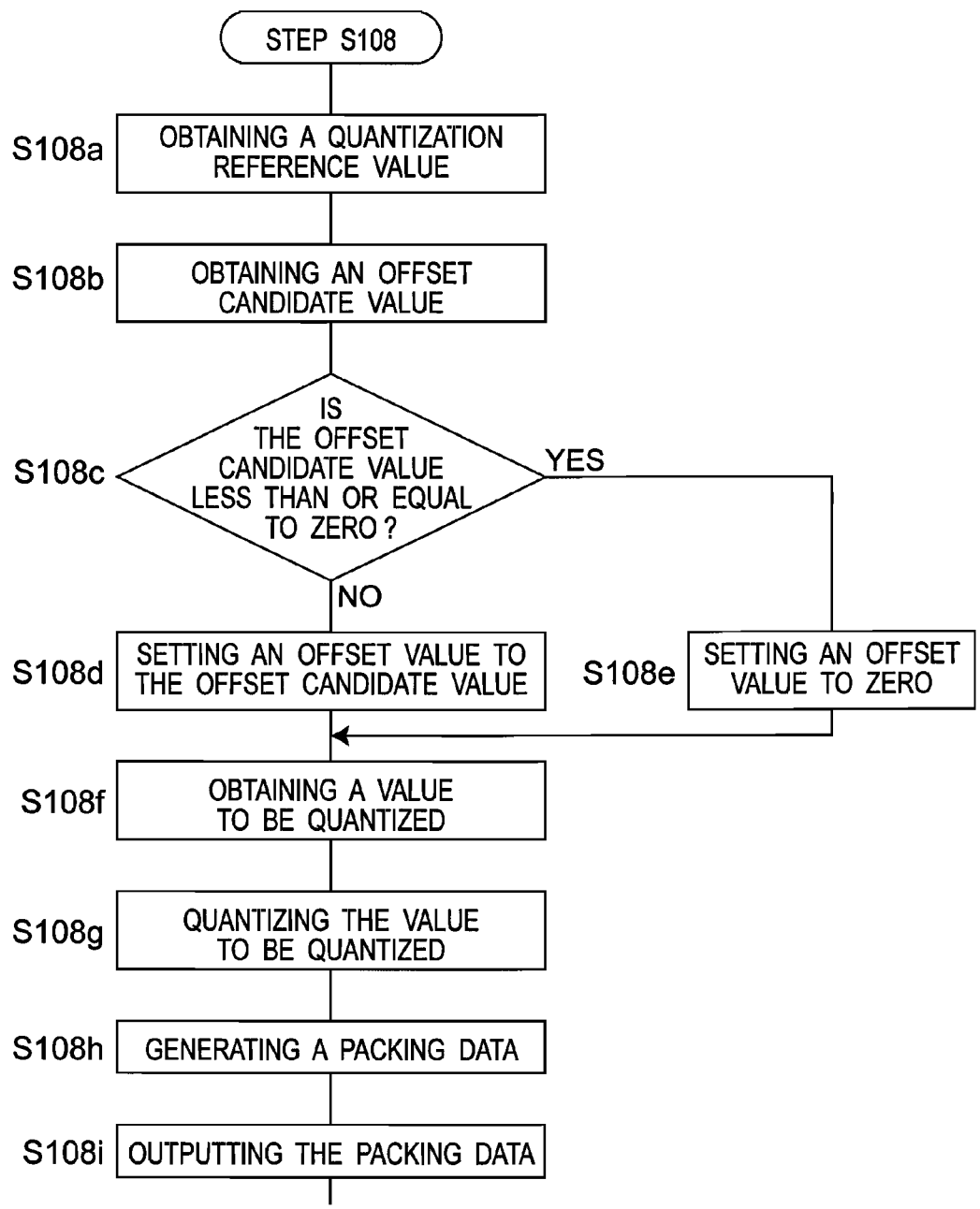

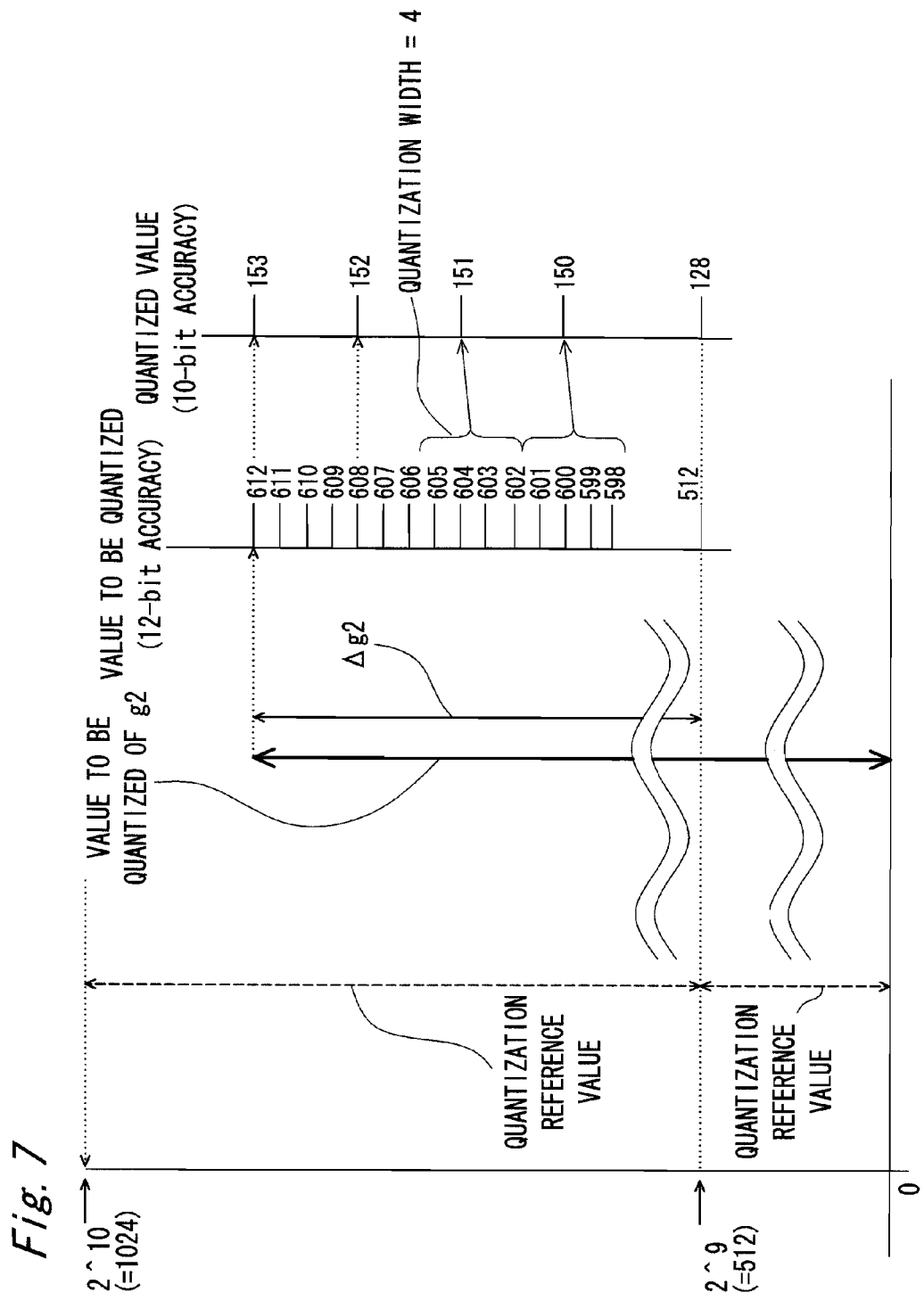

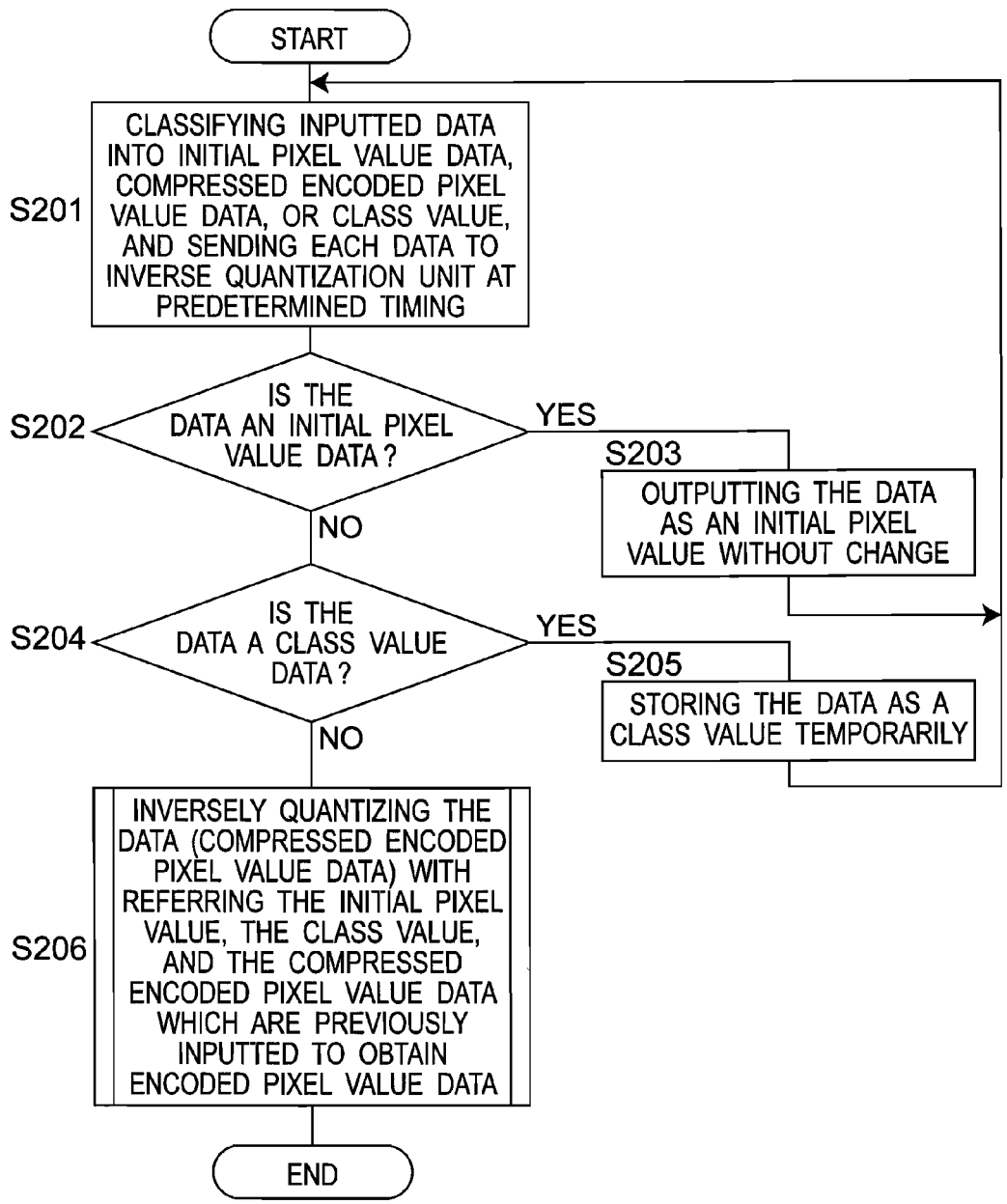

DIGITAL SIGNAL ENCODING AND DECODING DEVICE AND METHOD

This application is a PCT National Stage of PCT International application No. PCT/JP2006/314265, filed Jul. 19, 2006, and claims priority to JP 2005-215785, filed Jul. 26, 2005.

TECHNICAL FIELD

The present invention relates to a compression encoding and decoding of digital data. Specifically, the present invention relates to a device and a method for compressing and encoding a pixel signal outputted by an image pickup element, and for decoding the compressed and encoded pixel signal.

BACKGROUND ART

The image pickup element which is mounted on a digital imaging apparatus such as a digital camera and a cellular phone with a built-in camera includes such as a charge coupled type image pickup element (a CCD type image pickup element) and a metal oxide semiconductor type image pickup element (a MOS type image pickup element). Further, the MOS type image pickup element includes a complementary metal oxide semiconductor type image pickup element (a CMOS type image pickup element), an N-channel metal oxide semiconductor type image pickup element (an NMOS type image pickup element), and the like. In recent years, there is a tendency that the number of pixels of those image pickup elements has been increased, and each of them has been progressed as a high definition image pickup element. The CCD type image pickup element has characteristics that its dynamic range is wide with less noise, and the MOS type image pickup element has characteristics that a simple structure is achieved because of using an MOS process with a single power source, which is suitable for high resolution.

Next, a signal processing for imaging by using the digital imaging apparatus will be schematically explained.

An example of signal processing related to a still image pickup of one frame, namely, a single image pickup, in the digital imaging apparatus is shown. Light from an object forms an image at a light receiving unit of the image pickup element, and a number of pixels arranged on the light receiving unit accumulate charges of a certain quantity according to a light intensity. For one line of the light receiving unit, accumulated charges of pixels are read out pixel-by-pixel through an output unit of the image pickup element as analog signals, which are then converted into digital pixel signals (RAW data) in an analog/digital conversion unit, and is temporarily stored in a buffer memory such as a synchronous DRAM (SDRAM). When reading of the one line, A/D conversion, and writing into the SDRAM, etc, are completed, processing from the reading to the writing is similarly repeated for a second line, a third line, . . . , and a final line, and data of one frame of the image (one image pickup) is temporarily stored in the SDRAM. Next, a signal processing arithmetic operation such as a zoom processing of magnification/reduction is performed for the temporarily stored data, namely, RAW data, and the data after operation is temporarily stored in the SDRAM again. Next, by appropriately processing the data by using a processor, the data is converted into the data (compressed data) of a compressed data format such as JPEG being suitable for storing the data, and thereafter is temporarily stored in the SDRAM again. Then, the data is read out from the SDRAM at high speed by a direct memory access (DMA) control, etc., and the read data is stored in an external semi-permanent storage memory. Here, the semi-permanent storage memory may be a storage medium generally used as an image recording medium of a digital camera such as an SD Memory Card.

By continuously executing the signal processing related to the aforementioned single image pickup, a continuous image pickup, namely, a consecutive image pickup is realized. However, the processing from the RAW data to the data (compressed data) of the compressed data format is a time-consuming processing compared to the processing of reading out the accumulated charges of the pixel and temporarily storing it as the RAW data. Therefore, in case of a continuous shooting, the processing of storing the RAW data in the SDRAM, and the processing of converting the RAW data into the compression data are performed simultaneously, and the read out RAW data is temporarily stored in the SDRAM additionally as far as a storage capacity of the SDRAM allows. Accordingly, in order to increase the number of frames capable of continuous shooting, the storage capacity of the SDRAM needs to be increased.

In addition, along with an increase of the number of pixels of the image pickup element of recent years, a data size of the RAW data for one frame of an image is also increased. Therefore, when the storage capacity of the SDRAM is limited to a degree being same as that of a conventional product, the number of frames capable of continuous shooting is decreased along with the increase of the number of pixels of the image pickup element. Therefore, when a high definition of the imaging apparatus is realized by increasing the number of pixels of the image pickup element, the storage capacity of the SDRAM simultaneously needs to be made larger and the number of frames capable of continuous shooting needs to be secured. In addition, when the data size of the RAW data becomes large, the SDRAM capable of being accessed at higher speed than conventional is desired. However, a larger storage capacity of the SDRAM and a higher speed of access are disadvantageous in terms of its cost.

Conventionally, techniques for solving the aforementioned problem are proposed.

FIG. 11 is a block diagram illustrating a method for reducing a memory usage of a frame memory being disclosed in Patent Document 1, with a digital still camera taken as an example.

First, a configuration of the digital still camera of the Patent Document 1 will be explained. A digital still camera 100 includes: an image processing unit (CPU) 110; a flush memory 120; a JPEG-LSI 130; a display/capture controller 141; a buffer memory 142; a memory transfer controller 143; an address bus switching unit 144; a read data latch 145; an output level latch 146; a difference decompression/adder 147; a difference compression/decompression conversion table 148; a subtraction/difference compression unit 149; a write data latch 150; an input level latch 151; a frame memory 160; an image output unit 170; a image input unit 180; and a compression/decompression unit 140.

Next, an operation of the digital still camera 100 of the Patent Document 1 will be explained. The data before compression inputted from the image input unit 180 of FIG. 11 is sent to the subtraction/difference compression unit 149. Subtraction and difference compression are performed therein. At that time, the compression is performed with reference to the difference compression/decompression conversion table 148. The data after compression being obtained as a result is temporarily stored in the frame memory 160 through a data bus. Data before decompression being compressed that exists in the frame memory 160 is converted into the data after decompression with reference to the difference compression/decompression conversion table 148 in the difference decompression/adder 147, and is outputted from the image output unit 170.

This method needs to have the difference compression/decompression conversion table 148 in the ROM, or the like, for performing the compression of a difference value of the data. A circuit scale becomes smaller compared with a conventional method. Even so, it is inevitable to use the ROM, thus making a circuit structure larger, and a processing load is still large.

FIGS. 12 and 13 are schematic diagrams illustrating a method of irreversible compression encoding of the digital signal disclosed in Patent Document 2. FIG. 12 is a block diagram of a single board CCD, and FIG. 13 is a flowchart of the irreversible compression encoding. FIG. 12 shows a target pixel x, same color pixels f, e, d which are to be processed prior to the target pixel x, and different color adjacent pixels c, a, b being adjacent to the pixel x.

Next, the processing of a compression encoding method disclosed in the Patent Document 2 will be explained with reference to FIG. 13. This method is a method of performing an entropy encoding to a predicted error between a predicted value y by an optimum prediction expression and a value of a target pixel x in a single board CCD on which color filters R, G, B are arranged, so that the image data may be compressed. The method includes: calculating a predicted value by using the pixel value of a nearby pixel and the pixel value of the adjacent pixel on which a color filter of a color component different from that of the target pixel is arranged; calculating a predicted value by using the pixel value of the nearby pixel and a same color pixel on which the color filter of the same color as the target pixel is arranged; determining which of the predicted values is closer to the target pixel x; and deciding which a pixel value of the adjacent pixel or the same color pixel is to be used to calculate a predicted value of the next target pixel based on this determination result.

In this method, quantization is performed with a nonlinear table, a constant value is uniformly multiplied, and a table value to be used in an actual operation is calculated. Thus, compressibility can be changed in a irreversible conversion. The quantized data is further entropy-encoded.

In the method disclosed in the Patent Document 2, the memory such as a ROM is also required in quantizing the predicted error Δ being calculated from a pixel value by using a predetermined quantization table, thus enlarging a circuit structure and increasing a processing load.

FIG. 14 is a block diagram of an image encoding device disclosed in Patent Document 3. FIG. 14 shows the image encoding device in which an input pixel value of a dynamic range of d-bits is inputted from a pixel value input unit 101 and the input pixel value is encoded and converted into a quantized value of n-bits and the quantized value is then outputted from an output unit 105.

This image encoding device further includes: predicted value generating means 106 for generating a predicted value for the input pixel value; linear quantizer generating means 102 for generating, in d-bit accuracy, a linear quantizer having a quantization width set at (d−n)-th power of 2 and linear quantization representative points of the number which is obtained by subtracting an additional upper limit number being preliminarily set from n-th power of 2; and nonlinear quantizer generating means 103 for generating the nonlinear quantizer having a quantization width in the vicinity of the predicted value being set smaller than that of the linear quantizer by adding linear quantization representative points of the number which is less than the upper limit number to the linear quantizer in the vicinity of the predicted value. In the image encoding device, a quantization unit 104 quantizes the input pixel value by using the nonlinear quantizer which is generated in the nonlinear quantizer generating means 103 and a quantized value being obtained is outputted.

The image encoding device disclosed in Patent Document 3 has no ROM table for quantization. In this respect, this image encoding device is expected to be realized as a smaller-scaled apparatus than the apparatus of the invention disclosed in Patent Documents 1 and 2.

Patent Document 1: JP 11-341288 A
Patent Document 2: JP 2000-244935 A
Patent Document 3: JP 10-056638 A

DISCLOSURE OF INVENTION

Problem to be Solved by the Invention

The method described in Patent Document 1 needs to preliminarily prepare a table for encoding/decoding, and hence a memory such as a encoding/decoding table buffer or a ROM is required for storing the table. In addition, an apparatus for realizing the method of Patent Document 1 has a large circuit structure and a load involved in the processing is also heavy.

At the same time, in the method described in Patent Document 2, one of the predicted values of which prediction error is smaller than that of another is selected after performing the predictions for the same color pixel and for the different color pixel. Therefore, not only encoding but also decoding needs to be performed to determine which prediction formula should be used. Also, an increase of a processing amount is inevitable. Further, the processing is a nonlinear processing using the table, and therefore the circuit structure of the apparatus for realizing this method becomes large and the load involved in the processing is also heavy.

In the apparatus for realizing the method described in Patent Document 3, a circuit for calculating the predicted value needs to be configured and the process for calculating the predicted value needs to be executed.

In view of the above-described problem, an object of the present invention is to provide a digital signal compression encoding/decoding device that can be mounted with a small scale circuit structure. The process for encoding in the device is constructed with simple calculations. Thus the device is capable of realizing high compressibility with a low operation processing load. And the present invention provides a method for digital signal compression encoding and decoding.

Means for Solving Problem

According to one aspect of the present invention, the present invention provides a digital data encoding device. The digital data encoding device receives pixel value data in a digital format indicating a signal from a light receiving unit in which at least a pixel for sensing a first color and a pixel for sensing a second color are periodically arranged, and processes the data. The digital data encoding device includes: a difference generation unit which outputs a difference value between first pixel value data from a first pixel which senses the first color and second pixel value data from a second pixel which senses the first color being positioned in the vicinity of the first pixel as a first pixel difference value, and outputs a difference value of third pixel value data from a third pixel which senses a second color and fourth pixel value data from a fourth pixel which senses the second color being positioned in the vicinity of the third pixel, as a second pixel difference value; a quantization reference value determination unit which obtains a maximum value between an absolute value of the first pixel difference value and an absolute value of the second pixel difference value as a maximum pixel value difference, and determines a value being greater than or equal to the obtained maximum pixel value difference as a quantization reference value; an offset value setting unit which sets a difference between the first pixel value data and the quantization reference value as a first offset value and sets a difference between the third pixel value data and the quantization reference value as a second offset value; a value to be quantized setting unit which sets the difference between the second pixel value data and the first offset value as a first value to be quantized and sets the difference between the fourth pixel value data and the second offset value as a second value to be quantized; and a quantization unit which quantizes the first value to be quantized and the second value to be quantized and obtains first compressed encoded pixel value data and second compressed encoded pixel value data.

In one aspect of the present invention, it is preferable that the first color and the second color be different from each other.

In one aspect of the present invention, it is preferable that the digital data encoding device further include an offset value zero resetting unit which resets the offset value to zero when the offset value being defined by the offset value setting unit is less than or equal to zero.

In one aspect of the present invention, it is preferable that the digital data encoding device further include a quantization width determination unit which determines a quantization width of the quantization.

In one aspect of the present invention, it is preferable that the quantization width be increased as the maximum pixel value difference becomes larger.

In one aspect of the present invention, it is preferable that the digital data encoding device further include a quantization width information data generation unit which encodes the determined quantization width into a code of m-bit length (m is a natural number).

In one aspect of the present invention, it is preferable that the quantization width determination unit determine the quantization width to any one of preliminarily determined plural quantization widths.

In one aspect of the present invention, it is preferable that the number of the plural quantization widths be less than or equal to m-th power of 2.

In one aspect of the present invention, it is preferable that the m be 2.

In one aspect of the present invention, it is preferable that the digital data encoding device further include a compressed encoded image data generation unit, wherein the compressed encoded image data generation unit generates compressed encoded image data of s-bit length (s is a natural number) including at least one of the quantization width information data, the first compressed encoded pixel value data, and the second compressed encoded pixel value data and, more preferably, the s be a multiple of 8.

In one aspect of the present invention, it is preferable that the compressed encoded image data generation unit record the first pixel value data as they are in the compressed encoded image data as initial pixel value data.

In one aspect of the present invention, it is preferable that the quantization width determination unit obtain a maximum value between the numbers of digits required for an unsigned integer binary value notation of each of the first pixel difference value and the second pixel difference value so as to determine the quantization width from the plural quantization widths.

In one aspect of the present invention, it is preferable that the digital data encoding device further include: an error correction unit which corrects the second pixel value data and generates error corrected pixel value data; and a digital data decoding unit which decodes compressed encoded pixel value data and outputs decoded pixel value data, wherein: the offset value setting unit sets the first offset value by using the decoded pixel value data instead of the first pixel value data; and the value to be quantized setting unit sets the first value to be quantized by using the error corrected pixel value data instead of the second pixel value data.

In one aspect of the present invention, it is preferable that the correction of the second pixel value data by the error correction unit be performed by subtracting a correction value related to a difference between the first pixel value data and the decoded pixel value data from the second pixel value.

According to another aspect of the present invention, the present invention provides a digital data decoding device. The digital data decoding device includes: a compressed encoded image data input unit which inputs compressed encoded image data of s-bit lengths (s is a natural number) which has an initial pixel value data part in which first pixel value data of a first pixel which senses a first color are recorded as they are as first initial pixel value data and a compressed encoded pixel value data part in which first compressed encoded pixel value data indicating second pixel value data of a second pixel which senses the first color being positioned in the vicinity of the first pixel are recorded; an offset value setting unit which obtains a difference between the first initial pixel value data and a first quantization reference value being set as a first offset value; an inverse quantization unit which inversely quantizes the first compressed encoded pixel value data by using a first quantization width being set to obtain first inversely quantized pixel value data; and a decoded pixel value generation unit which obtains a sum of the first inversely quantized pixel value data and the first offset value to generate first decoded pixel value data.

In one aspect of the present invention, it is preferable that third pixel value data of a third pixel which senses a second color being positioned nearby the first pixel be further recorded as they are as second initial pixel value data in the initial pixel value data part. It is also preferable that second compressed encoded pixel value data which indicates fourth pixel value data of a fourth pixel which senses the second color being positioned in the vicinity of the third pixel be further recorded in the compressed encoded pixel value data part. It is further preferable that: the offset value setting unit obtain a difference between the second initial pixel value data and the first quantization reference value as a second offset value; the inverse quantization unit further inversely quantize the second compressed encoded pixel value data by using the first quantization width so as to obtain second inversely quantized pixel value data; and the decoded pixel value generation unit further obtain a sum of the second inversely quantized pixel value data and the second offset value to generate second decoded pixel value data.

In one aspect of the present invention, it is preferable that the first color and the second color be different from each other.

In one aspect of the present invention, it is preferable that: third compressed encoded pixel value data indicating fifth pixel value data of a fifth pixel which senses the first color being positioned in the vicinity of the second pixel and being nearby the fourth pixel be further recorded in the compressed encoded pixel value data part; the offset value setting unit further obtain a difference between the first decoded pixel value data and second quantization reference value being set as a third offset value; the inverse quantization unit further inversely quantize third compressed encoded pixel value data by using the second quantization width being set to obtain third inversely quantized pixel value data; and the decoded pixel value generation unit further obtain a sum of the third inversely quantized pixel value data and the third offset value to generate third decoded pixel value data.

In one aspect of the present invention, it is preferable that the digital data decoding device further include an offset value zero resetting unit which resets an offset value to zero when the offset value being defined by the offset value setting unit is less than or equal to zero.

In one aspect of the present invention, it is preferable that the compressed encoded image data include a quantization width information data part in which at least one of first quantization width information data having information regarding the first quantization width and second quantization width information data having information regarding the second quantization width be recorded.

In one aspect of the present invention, it is preferable that the digital data decoding device further include a quantization width setting unit which sets a quantization width of the inverse quantization to any one of the preliminarily determined plural quantization widths, wherein the quantization width setting unit sets the first quantization width and the second quantization width to ones of the plural quantization widths, respectively, on the basis of the first quantization width information data and the second quantization width information data.

In one aspect of the present invention, it is preferable that the digital data decoding device further include a quantization reference value setting unit which sets a quantization reference value of the inverse quantization to any one of the preliminarily determined plural quantization reference values, wherein the quantization reference value setting unit sets the first quantization reference value and the second quantization reference value, respectively, on the basis of the first quantization width information data and the second quantization width information data.

In one aspect of the present invention, it is preferable that the first quantization width information data and the second quantization width information data be pieces of data of m-bit lengths (m is a natural number), respectively.

In one aspect of the present invention, it is the plural quantization widths and the plural quantization reference values be less than or equal to m-th power of 2, respectively.

In one aspect of the present invention, it is preferable that the m be 2.

According to further aspect of the present invention, the present invention provides a digital data encoding method. The digital data encoding method is a method for receiving pixel value data in a digital format indicating a signal from a light receiving unit in which pixels for sensing a first color and pixels for sensing a second color are periodically arranged and processing the data. The digital data encoding method includes: generating and outputting a difference value between first pixel value data of a first pixel which senses a first color and second pixel value data of a second pixel which senses the first color and is positioned in the vicinity of the first pixel as a first pixel difference value and generating and outputting a difference value between third pixel value data of a third pixel which senses a second color and fourth pixel value data of a fourth pixel which senses a second color and is positioned in the vicinity of the third pixel as a second pixel difference value; obtaining a maximum value between an absolute value of the first pixel difference value and an absolute value of the second pixel difference value as a maximum pixel value difference, determining a value being greater than or equal to the maximum pixel value difference, and determining the value as a quantization reference value; setting a difference between the first pixel value data and the quantization reference value as a first offset value and setting a difference between the third pixel value data and the quantization reference value as a second offset value; setting a difference between the second pixel value data and the first offset value as a first value to be quantized and setting a difference between the fourth pixel value data and the second offset value as a second value to be quantized; and quantizing the first value to be quantized and the second value to be quantized to obtain first compressed encoded pixel value data and second compressed encoded pixel value data, respectively.

According to yet further aspect of the present invention, the present invention provides a digital data decoding method. The digital data decoding method includes: inputting compressed encoded image data of s-bit lengths (s is a natural number) which has an initial pixel value data part in which first pixel value data of a first pixel which senses a first color are recorded as they are as first initial pixel value data and a compressed encoded pixel value data part in which first compressed encoded pixel value data indicating second pixel value data of a second pixel which senses the first color being positioned in the vicinity of the first pixel are recorded; obtaining a difference between the first initial pixel value data and first quantization reference value being set as a first offset value; inversely quantizing the first compressed encoded pixel value data by using first quantization width being set to obtain first inversely quantized pixel value data; and obtaining a sum of the first inversely quantized pixel value data and the first offset value to generate first decoded pixel value data.

Effects of the Invention

The digital signal compression encoding and decoding device and the method of the present invention has no need to provide a table for encoding and decoding, and, hence, is constituted of a small scale circuit structure, and is capable of realizing high data compressibility by using a relatively simple operational processing.

BRIEF DESCRIPTION OF DRAWINGS

FIG. 5A is a flowchart of encoding processing.
FIG. 5B is a flowchart of encoding processing.
FIG. 7 is a graph illustrating a detail of quantization processing with a pixel value g2 taken as an example.
FIG. 8A is a flowchart of decoding processing.

[Explanations of Letters and Numerals]

| | |
|---|---|
| 1 | digital still camera (DSC) |
| 3 | lens |
| 5 | image pickup element |
| 7 | image pickup element drive unit |
| 9 | Signal pre-processing unit |
| 11 | Analog/digital conversion unit (ADC) |
| 13 | CODEC |
| 15 | SDRAM |
| 17 | YC processing unit |
| 19 | JPEG processing unit |
| 21 | controller |
| 23 | external interface |
| 25 | SD Memory Card |
| 27 | display unit |
| 29 | pixel |
| 31 | encoding unit |
| 33 | decoding unit |
| 35 | target pixel value input unit |
| 37 | difference generation unit |
| 39 | pixel value storage unit |
| 41 | difference quantization range determination unit |
| 43 | zone quantization width determination unit |
| 45 | initial pixel value generation unit |
| 47 | quantization unit |
| 47a | quantization reference value determination unit |
| 47b | offset value setting unit |
| 47c | value to be quantized setting unit |
| 47d | quantization unit |
| 47e | offset value zero resetting unit |
| 49 | class value code generation unit |
| 51 | packing unit |
| 51a | compressed encoded image data generation unit |
| 51b | compressed encoded image data output unit |
| 53 | unpacking unit |
| 55 | inverse quantization processing unit |
| 55a | offset value setting unit |
| 55b | inverse quantization unit |
| 55c | decoded pixel value generation unit |
| 55d | offset value zero resetting unit |
| 55e | quantization width setting unit |
| 55f | quantization reference value setting unit |
| 57 | output unit |
| 59 | error detection unit |
| 61 | coefficient multiplication unit |
| 63 | integer conversion unit |
| 65 | error correction unit |
| 67 | difference quantization range extraction unit |
| 69 | distribution ratio analysis unit |

BEST MODE FOR CARRYING OUT THE INVENTION

<Embodiment 1>
<Configuration of a Digital Still Camera>

Figure 1:
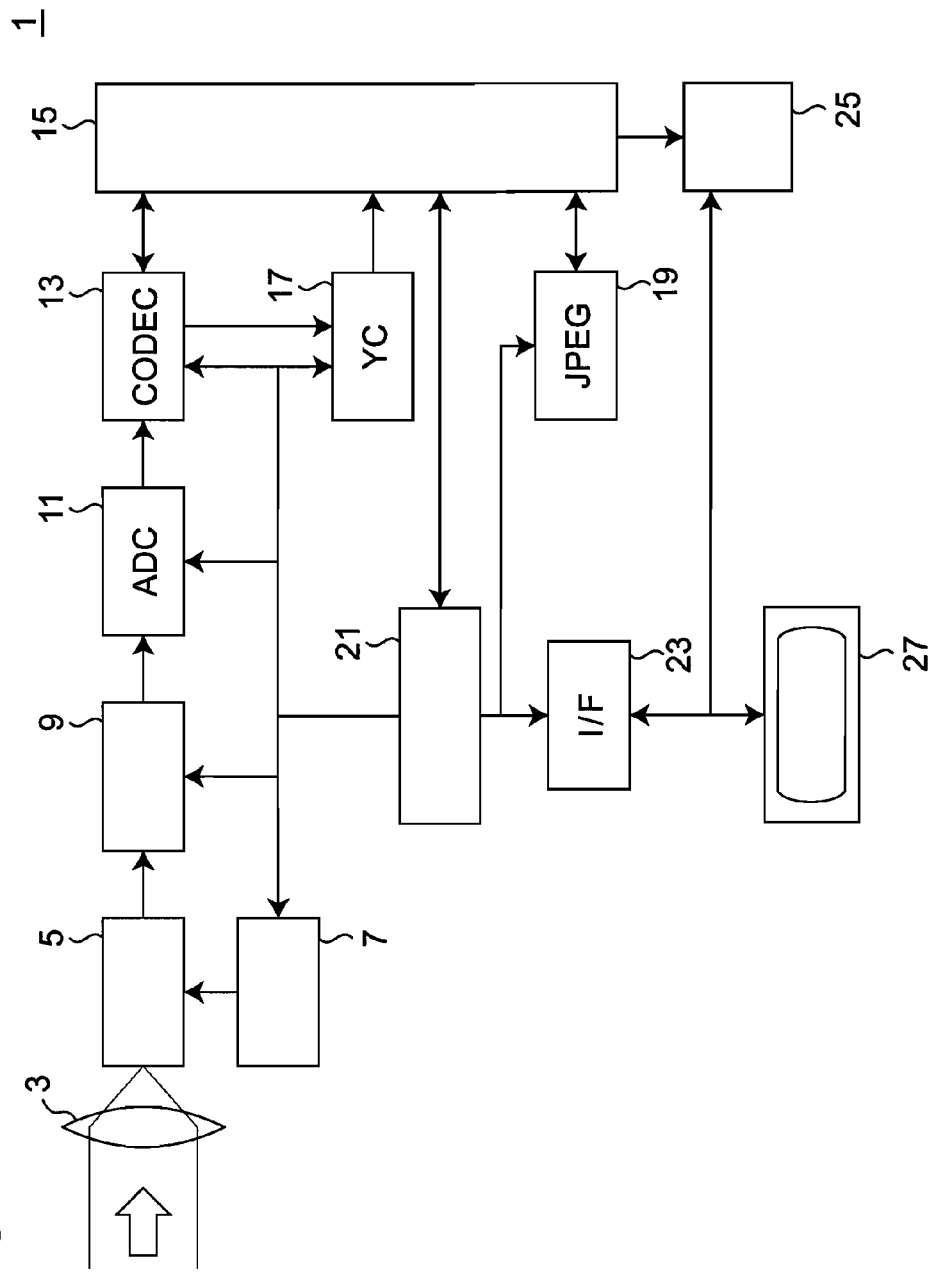
FIG. 1 is a block diagram of a digital still camera according to the present invention.

FIG. 1 is a block diagram of a digital still camera (DSC) 1 on which a digital signal compression encoding/decoding device (CODEC) 13 according to the present invention is mounted. Light incident to a lens 3 from an object being not shown is collected by the lens 3, and an image thereof is formed in a light receiving unit being not shown of an image pickup element 5. The image pickup element 5 is a CCD type imaging element. A pixel being not shown of the image pickup element 5 accumulates charges according to amount of the incident light. An image pickup element drive unit 7 outputs the accumulated charges as an analog pixel signal at a predetermined timing, and the signal is sent to a signal pre-processing unit 9. The signal pre-processing unit 9 applies pre-processing to the analog pixel signal, and sends the analog pixel signal to an analog/digital conversion unit 11. The analog/digital conversion unit (ADC) 11 converts the analog pixel signal into a digital pixel signal and outputs pixel value data in a digital format.

In the digital still camera 1 as a imaging apparatus, the digital pixel signal, which is the pixel value data of the digital format, being outputted from the ADC 11 is inputted to the digital signal compression encoding/decoding device (CODEC) 13. The CODEC 13 analyses the inputted digital pixel signal and sends compressed encoded pixel value data being obtained by analyzing the inputted digital pixel signal and compression-encoding the digital pixel signal, and information regarding compression encoding, etc., to an SDRAM 15 being as a buffer memory. A group of data thus being sent to the SDRAM 15 constitutes compressed encoded image data. Compression encoding and decoding in the CODEC 13 will be explained in detail below. The compressed encoded pixel value data etc. being outputted is stored in the SDRAM 15. The compressed encoded pixel value data etc. being stored in the SDRAM 15 is sent back to the CODEC 13 again and decoded therein to generate decoded pixel value data. The decoded pixel value data is sent to a YC processing unit 17 and is converted into luminance and color difference data. The luminance and color difference data is sent back to the SDRAM 15 again and is stored therein. The luminance and color difference data being stored in the SDRAM 15 is sent to a JPEG processing unit 19 and is subjected to JPEG compression processing. Thus obtained image data (JPEG image data), which is turned into JPEG data, is stored in the SDRAM 15. The JPEG image data is sent to an SD Memory Card 25 by DMA control etc. at high speed, which is an external storage medium, and is stored therein. A CPU being not shown and being included in a controller 21 executes a program stored in a memory being not shown and being included in the controller 21 and controls the aforementioned processing. In addition, the controller 21 is also capable of sending information stored in the SDRAM 15 via an external interface 23 to a display unit 27 and the SD Memory Card 25. Further, the controller 21 is also possible to read data of information stored in the SD Memory card 25.

Note that the image pickup element 5 may also be a MOS type image pickup element. The image pickup element 5 is not limited to the image pickup element having the pixels which sense three colors such as a pixel which senses red color, a pixel which senses green color, and a pixel which senses blue color. Also, the image pickup element 5 may be the image pickup element having pixels of the complementary color system. In addition, the image pickup element 5 may be the image pickup element having only pixels which sense two colors being different from each other. Further, the image pickup element 5 may be the image pickup element having pixels which sense only one color, or may be the image pickup element having not the pixels which sense light of a particular wavelength band only but the pixels of a uniform characteristic which sense light of wide range. The external storage medium is not limited to the SD Memory Card 25 but may be the one generally used as the image storage medium of a digital camera.

Figure 2:
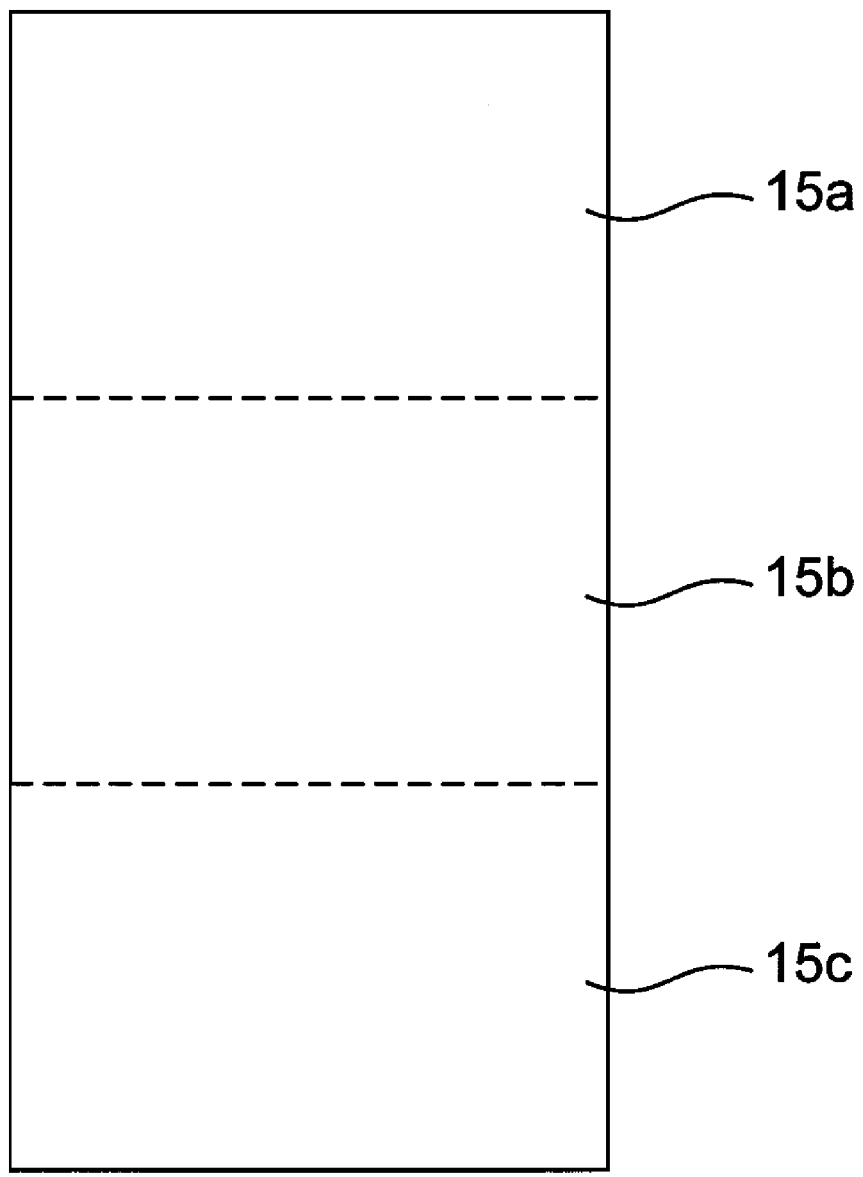
FIG. 2 is a schematic diagram of usage of a storage area of an SDRAM.

FIG. 2 is a diagram schematically showing a usage of the storage area of the SDRAM 15. As described above, the SDRAM 15 stores three kinds of data, namely, compressed encoded image data, luminance and color difference data, and JPEG image data. In this description, the area storing the compressed encoded image data is called as a storage area 15a, the area storing the luminance and color difference data is called as a storage area 15b, and the area storing the JPEG image data is called as a storage area 15c. A boundary of the storage area (broken line) shown in this figure is only a ritual one and does not show its actual ratio of usage.

In the imaging apparatus 1 according to the present invention, in the image pickup processing, first, a digital pixel signal (RAW data) which is based on the signal value outputted from the image pickup element 5 is compression-encoded by the CODEC 13 and the data is stored in the storage area 15a as compressed encoded pixel value data (a part of a data group constituting the compressed encoded image data). Next, after being subjected to decoding processing in the CODEC 13, the compressed encoded pixel value data is sent to the YC processing unit 17, and is then subjected to data processing and stored in the storage area 15b as the luminance and color difference data. Then, the luminance and color difference data is subjected to JPEG compression processing in the JPEG processing unit 19, and is stored in the storage area 15c as the JPEG image data. Thereafter, the JPEG image data is transferred to the SD Memory Card 25. Generation processing of the JPEG image data is the processing requiring much time with compared to other processing. Therefore, when continuous image pickup such as continuous shooting is executed, data that waits for the JPEG processing is increased, thus the storage area of the SDRAM 15 is encumbered. Therefore, in order to effectively use the storage area of the SDRAM 15 as much as possible and increase the number of shoots that can be continuously shot, it is effective to reduce a usage of the storage area 15a. The digital signal compression encoding according to the present invention has an advantage of reducing the amount of use of the area 15a since the digital pixel signal (RAW data) is compression-encoded and sent to the SDRAM 15. Thus, the storage area that may be used for the areas 15b and 15c can be taken large. As a result, the number of shoots of the digital still camera 1 which can be consecutively taken can be increased. In addition, the amount of data flow from/to the CODEC 13 to/from the SDRAM 15 is reduced, and therefore an advantage of shortening a processing time and reducing a consumption power also can be obtained.

Next, explanation will be given to the processing in the CODEC 13, which is a encoding and decoding device of the digital still camera 1, namely, the imaging apparatus of the present invention.

Figure 3:
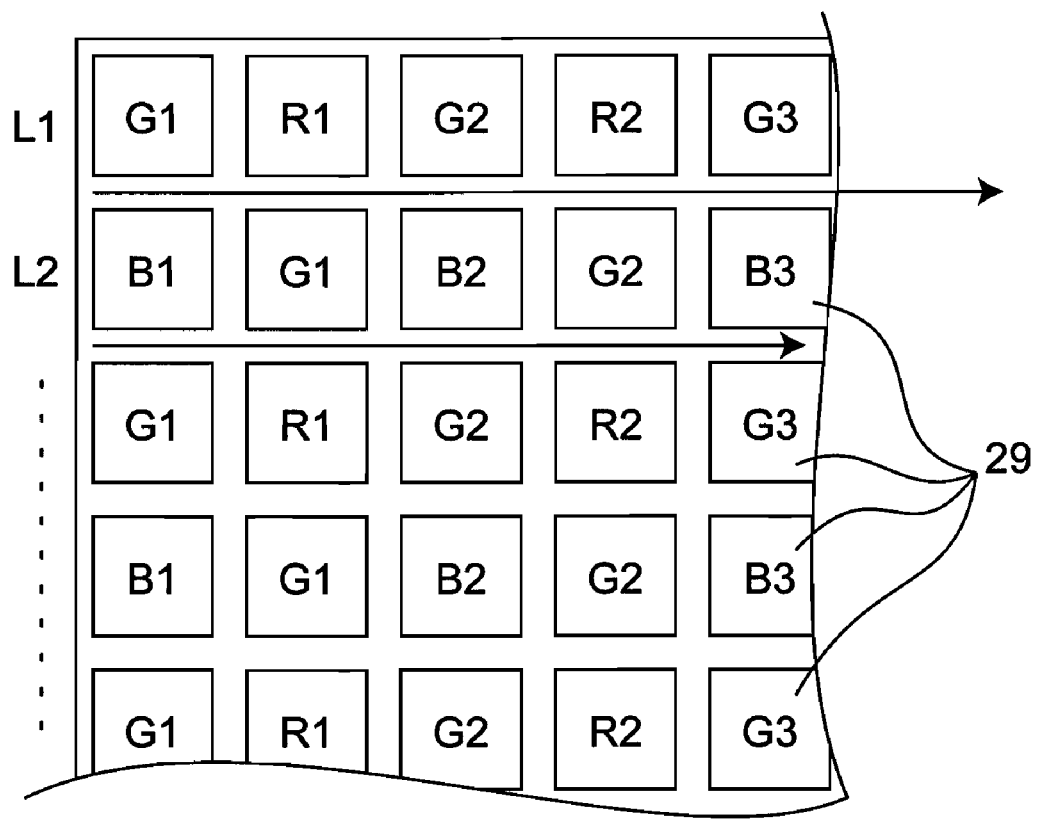
FIG. 3 is a schematic diagram of an arrangement of pixels of a light receiving unit of an image pickup element.

Before explanation is given to a configuration of the CODEC 13, first, the digital pixel signal (RAW data) which is inputted to the CODEC 13 will be explained with reference to FIG. 3. FIG. 3 is a diagram of an arrangement of pixels 29 in a light receiving unit of the image pickup element 5. A plurality of pixels 29 are arranged in the light receiving unit and a color filter of any one of red color (R), green color (G), or blue color (B) is disposed on each pixel 29. A wavelength band, (which is color for a visible light region), being sensed by each pixel 29 is limited by the color filter. The pixels that sense different colors (different wavelength bands) are periodically disposed in the light receiving unit. The style of the arrangement of the three color filters is a so-called Bayer array. An image pickup element drive unit (see FIG. 1) outputs charges accumulated in the pixel 29 sequentially from the pixel of a left side for each one line. For example, at first, accumulated charges are read out from a pixel G1 of a left end of a first line L1 sequentially in an order of G1, R1, G2, R2, . . . , and next, the accumulated charges are read out from a pixel B1 of a left end of a second line L2 sequentially in an order of B1, G1, B2, G2, . . . . Read charges are subjected to pre-processing in the pre-processing unit 9, and are converted into the digital pixel signal in an ADC 11. In the ADC 11, a signal from each pixel is converted into the digital pixel signal of 12 bits. Therefore, the digital pixel signals (pieces of pixel value data) having 12 bit length respectively are inputted to the CODEC 13, from the pixel G1 of the left end of the first line L1 in an order of pixel G1, pixel R1, pixel G2, pixel R2, . . . . When an input of the digital pixel signal from the pixel included in the first line L1 is completed, the digital pixel signal from the pixel included in the second line L2 is inputted to the CODEC 13 similarly.

<Configuration of CODEC 13>

Figure 4:
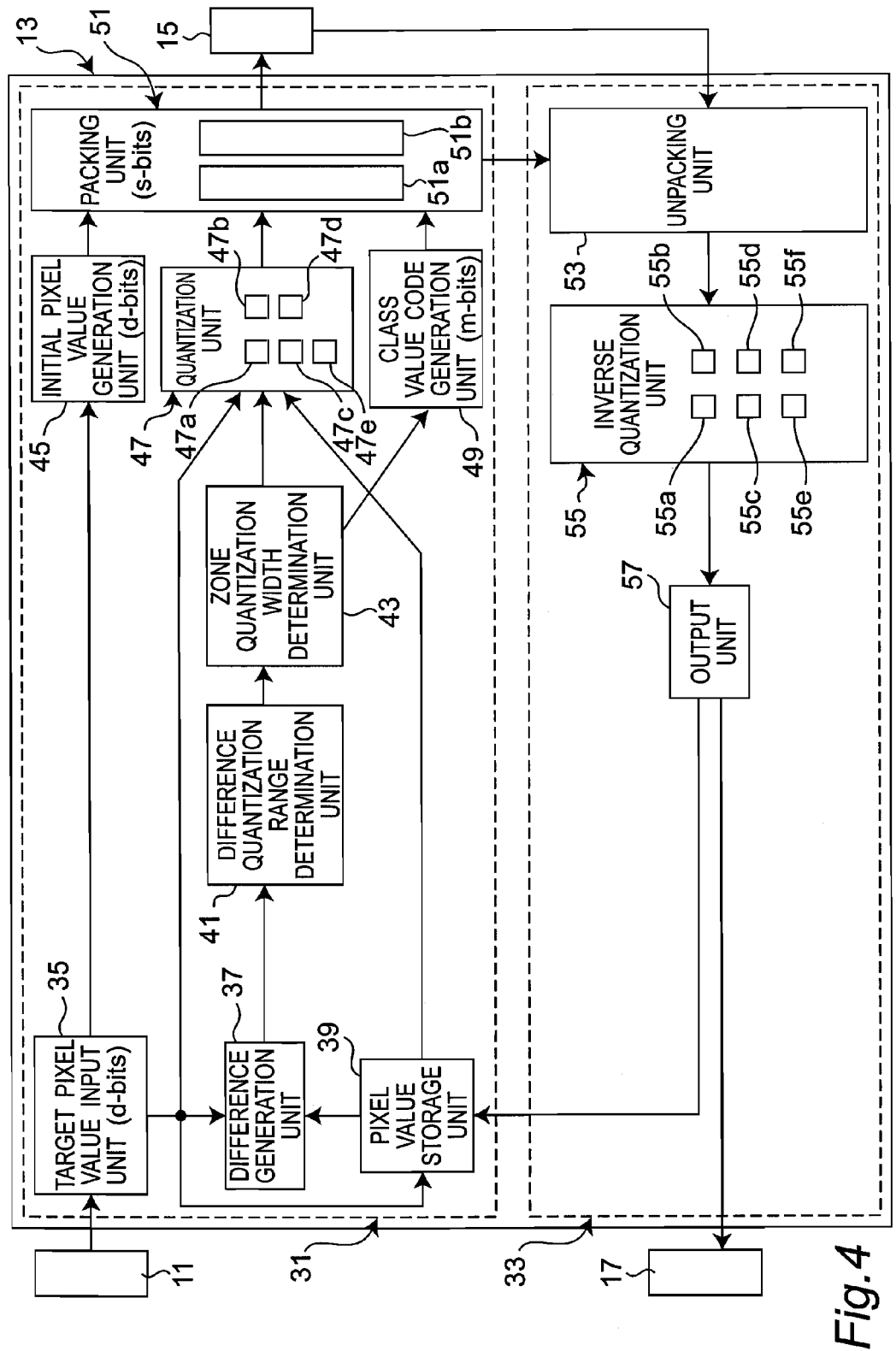
FIG. 4 is a block diagram of a CODEC 13 according to a first embodiment of the present invention.

FIG. 4 is a block diagram of the CODEC 13 according to this embodiment. The configuration of the CODEC 13 will be schematically explained below along with a flow of an encoded signal and a decoded signal. An illustration of an operation of the CODEC 13 will be described in detail later by using a certain value as a digital pixel signal, namely, a pixel value as an example.

Referring to FIG. 4, the CODEC 13 is divided broadly into an encoding unit 31 and a decoding unit 33. The encoding unit 31 which constitutes the digital data encoding device can input an output from the ADC 11 and output the data to the SDRAM 15 and the decoding unit 33. The decoding unit 33 which constitutes the digital data decoding device can input the output from the encoding unit and the SDRAM 15 and output the data to the encoding unit 31 and the YC processing unit 17.

<Compression Encoding Processing in the Encoding Unit 31>

Explanation will be given hereunder regarding the processing for the compression encoding of pixel value data (a digital pixel signal value) in the encoding unit 31 of the CODEC 13 with reference to FIGS. 4 and 5A. FIG. 5A is a flowchart of the compression encoding processing.

The pixel value of each pixel, which is outputted from the ADC 11, is inputted to a target pixel value input unit 35 at a predetermined timing. In this embodiment, each digital pixel signal value (pixel value data) is digital data of 12 bit length. That is, an input pixel value data bit length d is 12 in this embodiment.

According to FIG. 4, the pixel value data being inputted to the input unit 35 is sent to an initial pixel value generation unit 45, a difference generation unit 37, a quantization unit 47, and a pixel value storage unit 39 as a target pixel value.

The initial pixel value generation unit 45 sends the target pixel value having received to a packing unit 51 as initial pixel value data of d(=12) bit length. The packing unit 51 has a compressed encoded image data generation unit 51a which performs a generation of the compressed encoded image data and a compressed encoded image data output unit 51b which performs the output processing. When the generation unit 51a of the packing unit 51 determines that the initial pixel value data having received should be recorded in the compressed encoded image data, the generation unit 51a of the packing unit 51 performs processing wherein this initial pixel value data is included in the compressed encoded image data. When the generation unit 51a determines that the initial pixel value data having received may not be recorded in the compressed encoded image data as an initial pixel value data, the generation unit 51a ignores the initial pixel value having received. At least one initial pixel value for each pixel colors (R, G, B) should be present in the image data of one frame. However, in this embodiment, regarding the pixel value of each color, at least one initial pixel value data is recorded for every packing data of s-bit length, which will be described later. Regarding a certain packing data, the initial pixel value data of a certain color needs not be recorded if a pixel value of the certain color not recorded at all in the certain packing data. Here, the initial pixel value generation unit 45 does not substantially perform any particular processing, which outputs data being inputted as it is. The initial pixel value generation unit 45 is shown in the figure for the purpose of clarifying the processing of inputting the target pixel value in the packing unit 51 as the initial pixel value data. (Steps S101 and S102 of FIG. 5A).

The pixel value storage unit 39 temporarily stores a plurality of pieces of pixel value data, and output them to the difference generation unit 37 and the quantization unit 47 at an appropriate timing. The pixel values being stored are at least one of a previous target pixel value being previously inputted to the CODEC 13 as the pixel value data prior to the present target pixel value and the pixel value which is previously compressed and encoded, sent to the decoding unit 33, and subjected to the processing of decoding so as to be decoded, namely decoded pixel value data. The storage unit 39, out of the stored plurality of pieces of the pixel value data, sends a pixel value data or a decoded pixel value data of the pixel as a left side nearby same color pixel value to the difference generation unit 37 at a predetermined timing (see FIG. 3). The pixel 29 is, in the light receiving unit of the image pickup element, positioned in the vicinity of the pixel being a source of the present target pixel value. In addition, the pixel 29 has the same color as that of the pixel of the present target pixel value. The decoded pixel value is a data being subjected to the compression encoding processing and further decoded. In the light receiving unit, the pixel of the left side nearby same color pixel value is usually present in the left side of the pixel shown as the present target pixel value. When no pixel having the same color is present in the left side of the same line, the pixel value of the same colored pixel on the upper line which is present nearby may be used as the left side nearby same color pixel value. When no stored pixel value is present, a predetermined value may be outputted as the left side nearby same color pixel value. Note that, in this embodiment, the same color pixel being nearest to the target pixel is used as the same color pixel being positioned nearby. However, a pixel value from a pixel can be used in difference generation as long as the pixel is positioned nearby the target pixel.

The difference generation unit 37 generates a difference between the target pixel value being sent from the input unit 35 and the left side nearby same color pixel value being sent from the storage unit 39 (=the target pixel value—the left side nearby same color pixel value). (Step S103 of FIG. 5A). However, when the present target pixel value is recorded as the initial pixel value, the processing for the present target pixel value in the difference generation unit 37 is unnecessary. The value of the difference being generated is sent to a difference quantization range determination unit 41 as a pixel difference value.

The difference quantization range determination unit 41 obtains, based on an absolute value of a difference value regarding each target pixel value, namely, an absolute differential value which is sent from the difference generation unit 37, a "quantization range" of an absolute differential value of each target pixel value. The "quantization range" represents the number of digits of the absolute differential value in binary form, namely, the (a binary digit notation) absolute differential value. Specifically, the "quantization range" means the number of digits (the number of bits) required in a signed or an unsigned integer binary notation of the absolute differential value, namely, an unsigned integer binary notation of the difference value. The quantization range is sent to a zone quantization width determination unit 43. (Step S104 of FIG. 5A.)

The zone quantization width determination unit 43 starts following processing after receiving quantization ranges of other pixels being included in the same "zone," which will be described later, namely, quantization ranges of the second pixel, third pixel, fourth pixel, and the like from the difference quantization range determination unit 41. (Step S105 of FIG. 5A). The term "zone" here indicates a set of pixels of predetermined number, which are mutually positioned nearby, (and a set of the pixel values of those pixels). The "nearby" pixels indicate the adjacent or nearest pixel with respect to a certain pixel. Every pixel being included in the zone may be adjacent to any one of other pixels included in the same zone. The CODEC 13 of the present invention quantizes the pixel values included in the same zone according to the same quantization width, namely, "zone quantization width" as will be described later with same quantization accuracy (same quantization representative value interval). The number of pixels included in one zone may be 4 (p=4) in this embodiment. However, the number of pixels included in one zone, p, is not limited to 4, and may be the integer from 1 to the total number of pixels included in the light reception element. In addition, in compressing and encoding the pixel values of one frame of the image, the number p which is the number of pixels being included in the zone may be variable. The pixel which outputs the pixel value data used as the initial pixel value may not be included in any zone.

The zone quantization width determination unit 43 is a block for determining the quantization width. The zone quantization width determination unit 43 determines a zone quantization width, which is information regarding a quantization coefficient or the quantization width for quantizing the target pixel value. (Step S106 of FIG. 5A)

It may also be described that the "zone quantization width" is the data for transferring the information regarding a width (interval) of the quantization representative value for quantizing the pixel values being included in the same zone. The zone quantization width may be an integer value being greater than or equal to zero. The zone quantization width is equal to a difference between: a value obtained by adding 1 to the quantization range which corresponds to a maximum pixel value difference which is a maximum value of the difference values being differences between the pixel values included in the zone and the left side nearby same color pixel value; and the bit number, n, of the data obtained by compressing and encoding the pixel value data, namely, "compressed and encoded pixel value data bit number (n)." This "compressed and coded pixel value data bit number (n)" may be a predetermined value, and in this embodiment, this value is n=8. This means that the compressed encoded pixel value data corresponding to its pixel value is recorded as the data having an 8 bit length, meanwhile the data of the target pixel value being inputted has 12 bit length. However, the bit number n of this compressed encoded pixel value data is not limited to eight. In addition, in a series of compression encoding for the pixel values of one frame of the image, this value may be variable. Further, as a result of the aforementioned calculation, when the zone quantization width is a negative number, the zone quantization width may be reset to 0.

Here, it can be also described that the "quantization representative value interval" indicates the number of integer values before quantization which are to be quantized to an identical quantized value by the quantization of those integer values. For example, when no rounding is performed at all in quantizing the digital data expressing a certain integer value, the quantization representative value interval is 0-th power of 2=1. In this case, the quantization is performed with one-to-one correspondence between the integer value and its quantized value being kept. In addition, when the quantization representative value interval is expressed as 1st power of 2=2, this means that the 1 bit of a lowest-order of digital data of an integer value is rounded at the quantization. Consequently, two kinds of digital data each of which indicate two different kinds of integer values are quantized to an identical quantized value. Further, when the quantization representative value interval is expressed as 2nd power of 2=4, this means that the 2 bits of a lowest-order of digital data of an integer value is rounded at the quantization. Consequently, four kinds of digital data each of which indicate four different kinds of integer values are quantized to an identical quantized value. The same goes for a case of rounding 3 bits or more of lowest-order of digital data.

The zone quantization width thus determined is sent to the quantization unit 47 and a class value code generation unit 49.

The class value code generation unit 49 generates quantization width information data. The class value code generation unit 49 sends a "class value" of m bits, namely, quantization width information data, which corresponds to the zone quantization width having received, to the packing unit 51. In this embodiment, m=2. This "class value" is the data indicating a quantization coefficient in the quantization of the pixel value data included in the zone (bit numbers being rounded by quantization), which is then processed and recorded by the packing unit 51 together with the compressed encoded pixel value data which is the compressed pixel value data. (Step S107 of FIG. 5A)

In FIG. 4 again, the quantization unit 47 performs quantization based on the target pixel value, left side nearby same color pixel value, and zone quantization width having received, and sends a result to the packing unit 51 as the compressed encoded pixel value data, which is the compressed value of the target pixel value. (Step S108 of FIG. 5A)

The quantization unit 47 includes:

a quantization reference value determination unit 47*a* which determines a quantization reference value;

an offset value setting unit 47*b* which sets an offset value or an offset candidate value from the pixel value data and the quantization reference value;

an offset value zero resetting unit 47*e* which resets the offset (candidate) value being zero or less to the offset value having a value zero;

a value to be quantized setting unit 47*c* which sets a value to be quantized which is a value actually quantized; and a quantization unit 47*d* which quantizes the value to be quantized.

The processing by the quantization unit 47 is described in detail by using an processing example described below.

The packing unit 51 has a function of collecting several kinds of inputted data, namely, pieces of compressed encoded data and packing them into a piece of an appropriate size (generation unit 51*a*) and a function of outputting the packed data to the SDRAM 15 and an unpacking unit 53 (output unit 51*b*). Also, the packing unit 51 can output each data as it is without packing. In this embodiment, a size of the packing data, which is the compressed encoded image data, is s-bits. The s (s: natural number) may be an integral multiple of 8 (such as 8, 16, . . . , 64, . . . , 96, etc.). When a small number of unused bits which can not be used for recording meaningful data remains, a predetermined dummy data may be recorded therein.

<Decoding Processing by the Decoding Unit 33>

The unpacking unit 53 is the block which inputs the compressed encoded image data. The unpacking unit 53 analyzes packing data or unpacked data having received from the packing unit 51 and packing data having received from the SDRAM 15. The unpacking unit 53 separates the packing data into: an initial pixel value data part including initial pixel value data; a quantization width information data part including the class value; and a compressed encoded pixel value data part including the compressed encoded pixel value data, and further separates those data parts into one or more pieces of data. Those pieces of data are sent to an inverse quantization unit 55.

The inverse quantization unit 55 includes:

an offset value setting unit 55*a* which sets an offset value by using the initial pixel value data or the decoded pixel value data, and the quantization reference value;

an inverse quantization unit 55*b* which inversely quantizes the compressed encoded pixel value data to obtain inversely quantized pixel value data;

a decoded pixel value generation unit 55*c* which generates the decoded pixel value data by using the pixel value data or the decoded pixel value data, and the inversely quantized pixel value data;

an offset value zero resetting unit 55*d* which resets an offset value or an offset candidate value being zero or less to zero;

a quantization width setting unit 55*e* which sets a quantization width; and a quantization reference value setting unit 55*f* which sets a quantization reference value.

The inverse quantization unit 55 inversely quantizes the compressed encoded pixel value data using several kinds of pieces of data having received. The inverse quantization unit 55 performs reversed processing with respect to the processing in the quantization unit 47 to obtain an inversely quantized pixel value data. The inverse quantization unit 55 further processes the inversely quantized pixel value data to obtain the decoded pixel value data, which is decoded data. The decoded pixel value data (12-bit length data in this embodiment) is sent to the output unit 57. As to the initial pixel value data, it is sent to the output unit 57 as it is since the initial pixel value data is received as non-compressed data (actual data) of 12-bit length.

The output unit 57 sends initial pixel value data and decoded pixel value data having received to the YC processing unit 17 and the image pixel storage unit 39. In the pixel value storage unit 39, the decoded pixel value data having received can be utilized for difference generation processing and quantization processing on other target pixel values.

<Exemplified Compression Encoding Processing>

The compression encoding processing and the decoding processing by the CODEC 13 according to the present embodiment will be explained in detail with reference to FIG. 5B, FIG. 6, and FIG. 7. Specific numerical values are given to the target pixel value, etc. FIG. 5B is a flowchart of details of the processing in step S108 of FIG. 5A.

12-bit data is inputted from the ADC 11 to the target pixel value input unit 35 at a predetermined timing. At first, a pixel value g1 of a pixel G1 is inputted, and next, a pixel value r1 of a pixel R1 is inputted, and similarly g2, r2, g3, r3, . . . are inputted. In one image taking, preferably, the pixel value which is inputted first with respect to each color (g1 and r1 in this example) is sent to the initial pixel value generation unit 45 and is processed as the initial pixel value data, and then, sent to the packing unit 51. The initial pixel value is recorded as the actual data. The initial pixel value is not subjected to the difference generation processing and the quantization processing. However, the initial pixel value is necessary for applying the compression encoding processing to the pixel value data of the next same color pixel. Therefore, the initial pixel value is sent to the quantization unit 47 and the pixel value storage unit 39 and is temporarily stored therein. In addition, if the data of the target pixel value is processed as the initial pixel value data at an interval of predetermined number of pixels, an effect of resetting (removing) an accumulated error due to quantization is expected and so that an improvement in SN ratio of a reproduced image with respect to an inputted image is expected.

In the present embodiment, four pixels are included in one zone (namely, p=4). The pixel values g1 and r1 each of which are respectively treated as the initial pixel value data are sent to the packing unit 51 as they are. And then, they are respectively recorded into the packing data as pieces of data of 12-bit width. Next, pixels G2, R2, G3, and R3 are treated as the pixels all of which are included in a first zone. The same goes for a second zone and a third zones.

Next, the processing on the pixel values g2, r2, g3, and r3, all of which are included in the first zone, will be explained. For the pixel values g1, r1, g2, r2, g3, and r3, values described in a table below (table 1) are used as a specific example of the values.

TABLE 1

| Pixel | G1 | R1 | G2 |
|---|---|---|---|
| Pixel value | g1 | r1 | g2 |
| Pixel value (decimal notation) | 2000 | 250 | 2100 |
| Pixel value (binary notation) | 011111010000 | 000011111010 | 100000110100 |

| Pixel | R2 | G3 | R3 |
|---|---|---|---|
| Pixel value | r2 | g3 | r3 |
| Pixel value (decimal notation) | 50 | 1700 | 100 |
| Pixel value (binary notation) | 000000110010 | 001110100100 | 000001100100 |

Pixel value g2 is designated as a target pixel value. The pixel value g2 is sent to the quantization unit 47, the difference generation unit 37, and the pixel value storage unit 39 as the target pixel value. At this time, the pixel value g1 is sent from the pixel value storage unit 39 to the difference generation unit 37 as the left side nearby same color pixel value to obtain the difference value between those pixel values. That is, if $\Delta g2$ is set as the difference value at this time, $$\Delta g2 = g2 - g1.$$

The difference value $\Delta g2$ is sent to the difference quantization width determination unit 41.

When the generalization of this difference generation processing is attempted, it can be expressed as $\Delta ci = ci - c(i-1)$, (c represents the color of the pixel, and c:r, g, or b, and i is the integer value indicating an order of the pixel). ci is the target pixel value and c(i-1) is the left side nearby same color pixel value. The left side nearby same color pixel value is the target pixel value having previously inputted or the decoded pixel value data which had been subjected to compression encoding processing once and has been decoded. As is the case where i=1, when there is no pixel value data designated by a subscript "i-1", the pixel value data of the pixel being positioned in the light receiving unit of the image pickup element and above and vicinity of the target pixel value may be used. In this example, the target pixel value having been previously inputted is used as the left side nearby same color pixel value. In generating the difference for pixel values which are included in a second or later zone, the decoded pixel value data can be used as the left side nearby same color pixel value.

Similarly, the difference value $\Delta g2$ regarding the r2 as the target pixel value, the difference value $\Delta g3$ regarding the g3 as the target pixel value, and the difference value $\Delta g3$ regarding the r3 as the target pixel value are obtained. As to the target pixel value g3, the difference between the target pixel value g3 and the pixel value g2 being stored in the pixel value storage unit 39 is the difference value $\Delta g3$.

The difference quantization width determination unit 41 obtains an absolute value of each difference value having received, namely, the absolute differential value, and obtains the number of digits of the binary notation of the absolute differential value, namely, the quantization range (a number of bits required, bit( )).

As to $\Delta g2$, the difference value is +100, and therefore, the absolute differential value is 100 as it is. The 100 of decimal notation is 1100100 in binary notation. Therefore, the required bit number, bit($|\Delta g2|$) is 7. In this description, decimal X is noted as &D(X), and binary Y is noted as &B(Y). Similarly obtained four quantization ranges (bit($|\Delta g2|$), bit($|\Delta r2|$), bit($|\Delta g3|$), and bit($|\Delta r3|$) are sent to the zone quantization width determination unit 43.

When the generalization of the processing in the difference quantization width determination unit 41 is attempted, it can be expressed that the absolute value of the difference value, namely, the absolute differential value is obtained and the number of digits of the absolute differential value in binary notation is outputted to the zone quantization width determination unit 43 as the quantization range.

After receiving an input of each quantization range regarding the pixel value of the pixel being included in the first zone, the zone quantization width determination unit 43 determines the zone quantization width.

The zone quantization width is equal to the difference between the value obtained by adding 1 to the maximum value among the quantization ranges of the pixels being included in the zone, and the number of bits of the compressed encoded pixel value data. However, in case where the zone quantization width is a negative number, the zone quantization width is set to zero. That is, the zone quantization width is determined on the basis of the maximum pixel value difference which is the maximum value among the absolute differential values between the left side nearby same color pixel value and the pixel value being included in this zone.

In this embodiment, the pixel value data is compressed and encoded to the compressed encoded pixel value data of 8-bit length, and thus, the bit number of the compressed encoded pixel value data n=8. Therefore, the zone quantization width is 2(=9+1−8).

When the zone quantization width determination unit 43 determines the zone quantization width, the zone quantization width determination unit 43 sends the zone quantization width to the quantization unit 47 and the class value code generation unit 49.

In the quantization unit 47, a "value to be quantized", which is a value based on the received difference value between the target pixel value and the left side nearby same color pixel value, is quantized based on the zone quantization width.

The zone quantization width of the first zone is 2. There is a correlation between the zone quantization width and an accuracy of the quantization executed by the quantization unit and between the zone quantization width and the interval of the quantization representative value. Because of the correlative relationship, an interval of the quantization representative values is also increased with an increase of the zone quantization width. In the present invention, the value to be subjected to quantization processing is obtained from the pixel values being included in the same zone. It is desired that the accuracy of the quantization should be higher (the interval of the quantization representative values should be narrower). However, there is a necessity of lowering the accuracy of the quantization so as to convert the value to be quantized to a code having a predetermined bit length when the value to be quantized is large. In such case, the accuracy of the quantization is lowered, that is, the interval of the quantization representative values is enlarged. The zone quantization width can be an index of quantization accuracy possible. The zone quantization width and the related accuracy of the quantization (or the interval of the quantization representative values) may be determined in consideration of the intended bit length of a code, which is also related to the zone quantization width.

In this example, the interval of the quantization representative values is set to 4, that is, 2 bits of the lowest-order of the value to be quantized are rounded, so as to obtain the compressed encoded pixel value data of 8-bit length.

In the CODEC 13 of the present invention, the difference value itself is not quantized, but the "value to be quantized" is calculated first based on the target pixel value and its left side nearby same color pixel value, and the value to be quantized thus obtained is quantized and the quantized value is outputted as the compressed encoded pixel value data.

Values in this example, such as the target pixel value, the difference value, the compressed encoded pixel value data, and values used in the processing are shown in table 2.

TABLE 2

| Pixel | G1 | R1 | G2 | R2 |
|---|---|---|---|---|
| Pixel value | g1 | r1 | g2 | r2 |
| Pixel value (in decimal notation) | 2000 | 250 | 2100 | 50 |

| Pixel | G2 | R2 | G3 | R3 |
|---|---|---|---|---|
| Pixel value | g2 | r2 | g3 | r3 |
| Pixel value (in decimal notation) | 2100 | 50 | 1700 | 100 |
| Difference value | $\Delta g2$ | $\Delta r2$ | $\Delta g3$ | $\Delta r3$ |
| Difference value (in decimal notation) | 100 | −200 | −400 | 50 |
| Selected class | | &D(2) (&B(10)) | | |
| Quantization width | | 4 (=2^(10 − 8)) | | |
| Quantization accuracy | | 10 bit accuracy (12 − (10 − 8)) (8-bit quantization of 10-bit length data) | | |
| Quantization reference value (=2^(Quantization accuracy − 1)) | | 512 (=2^(10 − 1)) | | |
| Offset candidate value (Left side nearby same color pixel value − quantization reference value) | 1488 | −262 | 1588 | −462 |
| Sign of offset candidate value | + | − | + | − |
| Offset value | 1488 | 0 | 1588 | 0 |
| Value to be quantized (in decimal notation) (=target pixel value − offset value) | 612 | 50 | 112 | 100 |
| Value to be quantized (in binary notation) | 0011100100 | 0000110010 | 0001110000 | 0001100100 |
| Quantized value (in binary notation) (Compressed encoded pixel value data) | 00111001 | 00001101 | 00011100 | 00011001 |

First, the quantization processing will be explained, with a calculation of the compressed encoded pixel value data of the pixel value data of the pixel G2 taken as an example. The quantization width of the first zone is 4. (By rounding 2 bits of the lowest-order of the data, the 8-bit length data is obtained from the 10-bit length data. Therefore, the data regarding the pixel value of 12-bit length is rounded by 2-bit and is quantized with 10-bit accuracy.) In this case, the "quantization reference value" (=(quantization accuracy−1)-th power of 2) is 512 (step S108a of FIG. 5B). That is, the quantization reference value is uniquely determined from the quantization accuracy, which is defined by the zone quantization width being determined based on the maximum pixel value difference. Specifically, the quantization reference value is determined based on the maximum pixel value difference. Note that the quantization reference value may be a value which is greater than or equal to the maximum pixel value difference. Next, this quantization reference value is subtracted from the pixel value g1, which is the left side nearby same color pixel value of the pixel value g2, to obtain the "offset candidate value" (step S108b of FIG. 5B). The sign of the offset candidate value is checked. When the sign is non-negative, this offset candidate value is set as the "offset value" as it is. When the offset candidate value is negative, the offset value is set to 0 (steps S108c, S108d, and S108e of FIG. 5B). Next, the offset value is subtracted from the target pixel value g2 to obtain the "value to be quantized" (step S108f of FIG. 5B). This operation can also be described that a sum of the difference value Δg2 and the quantization reference value is set as the "value to be quantized". As to the pixel G2, this value is &B(0011100100). 2 bits of the lowest-order of this value to be quantized is rounded, and the quantized value (compressed encoded pixel value data) &B(00111001) is obtained (step S108g of FIG. 5B). When the highest-order bit in the rounded bits is "1", the value which is obtained by adding "1" to the lowest-order bit of the not rounded bits is set as the compressed encoded pixel value data. As a matter of course, when a carry to an upper digit occurs by addition of the "1", other bits are also changed. Note that when the offset candidate value is negative, the offset candidate value may be obtained by assigning all digits of the offset candidate value to zero except the r bits of the lowest-order of the offset candidate value. Here, r may be equal to the rounded bit number by quantization. For example, when the zone quantization width is 4, 2-bits are rounded in quantization, and therefore the value obtained by assigning all bits of the offset candidate value to zero except the r bits of the lowest-order such as &B(0000000010) may be set as the offset value and the processing thereafter may be performed using the offset value as thus obtained. In this case, the value to be quantized of the pixel R2 is &D(48).

Next, explanation will be given, with the quantization of the pixel value r2 of the pixel R2 taken as an example. The left side nearby same color pixel value of r2 is r1. Hence, the offset candidate value is −262. When the offset candidate value is negative, the offset value is 0. Therefore, the value to be quantized is the pixel value r2 itself of 10-bit length, from which 2 bits of the upper-order of the pixel value r2 are excluded, and the value thus obtained is &B(0000110010). 2 bits of the lowest-order of this value to be quantized are rounded, and the quantized value (compressed encoded pixel value data) &B(00001101) is obtained. Similarly, the compressed encoded pixel value data &B(00011100) of the pixel value g3 of the pixel G3 and the compressed encoded pixel value data &B(00011001) of the pixel value r3 of the pixel R3 are obtained.

Figure 6:
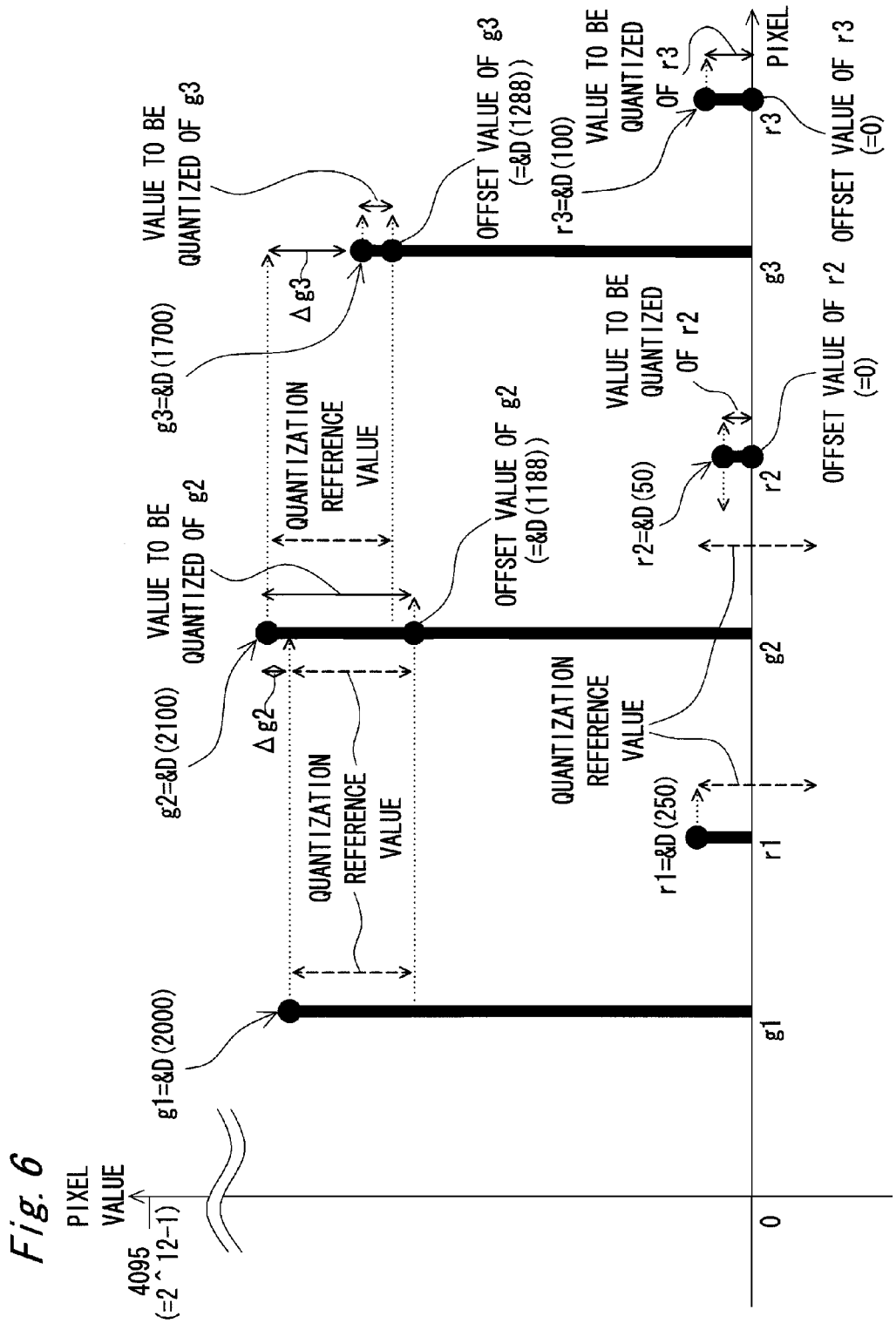
FIG. 6 is a graph showing a relation of quantities in quantization.

Referring to FIGS. 6 and 7, used quantities in the processing of the quantization unit 47 and processing steps are described. FIG. 6 is a graph plotting a relation between the pixel values g1, r1, g2, r2, g3, and r3 being used in this example and other quantities being also used in this example. The pixel value is an integer value from 0 up to 4095, which is given as 12-bit data. In the quantization of the pixel value g2, the offset value of g2 is obtained based on the pixel value g1 and the quantization reference value, and the value obtained by subtracting the offset value of g2 from the pixel value g2 is set as the value to be quantized of g2. The value to be quantized of g2 is also equal to the sum of the quantization reference value and the difference value Δg2. Therefore, the value to be quantized of g2 can also be obtained without using the pixel value g1 and the pixel value g2. In the quantization of the pixel values r2 and r3, the offset value is 0. Therefore, the values to be quantized of r2 and r3 are equal to the pixel values r2 and r3. In the quantization of the pixel value g3, the offset value of g3 is obtained based on the pixel value g2 and the quantization reference value, and the value obtained by subtracting the offset value of g3 from the pixel value g3 is set as the value to be quantized of g3. The value to be quantized of g3 is also equal to the sum of the quantization reference value and the difference value Δg3. Therefore, the value to be quantized of g3 can also be obtained without using the pixel values g2 and g3.

FIG. 7 is a graph showing details of the quantization processing, with the pixel value g2 taken as an example. The values to be quantized of all pixel values are the values in a range from 0 to twice the quantization reference value (the value of less than or equal to &D(1024) in this example). In the quantization, the value to be quantized of g2 is rounded with the quantization width 4. Therefore, the quantized value of g2 is &D(153). The value expressed in an 8-bit binary notation such as &B(00111001) is the compressed encoded pixel value data of the pixel G2. FIG. 7 shows an example of rounding up and rounding down of the value to be quantized. For example, when the value to be quantized is in a range from &D(602) to &D(605), the quantized value is &D(151), and when the value to be quantized is in a range from &D(598) to &D(601), the quantized value is &D(150). Thus, when the highest-order bit in the rounded bits is "1", the number is rounded-up, and when the highest-order bit in the rounded bits is "0", the number is rounded-down. Note that in the quantization in the quantization unit 47, a simple bit shift (performing rounding down the every data) may be performed.

The quantized value of each pixel value thus obtained is sent to the packing unit 51 as the compressed encoded pixel value data of 8-bit length, and is used for the generation of packing data (step S108h of FIG. 5B) and output of packing data (step S108i of FIG. 5B). As to pixel values being included in the second or later zone, the packing data can be used in the quantization processing as the left side nearby same color pixel value, by sending the decoded pixel value data which is sent to the decoding unit 33 from the packing unit 51 and decoded therein, to the pixel value storage unit 39 and stored therein, and by sending this data to the quantization unit 47.

<Generation of a Class Value Code in the Class Value Code Generation Unit 49>

In the class value code generation unit 49, the class value is sent to the packing unit 51 as the data of m-bit length, based on the zone quantization width having received. In this embodiment, m=2. When the zone quantization width is 2, the class value data of 2-bit length corresponding thereto is sent to the packing unit 51. The bit length m of the class value data is not limited to 2. In this embodiment, four kinds of class values are used, and hence, the m is set as m=2. When more kinds of class values are required, m may be set to a larger integer value. The class value is an index of the accuracy of the quantization (or the interval of the quantization representative values).

<Packing of the Data in the Packing Unit 51>

The initial pixel value data, the compressed encoded pixel value data, and the class value data being the quantization width information data, which are sent to the packing unit 51, are immediately sent to an unpacking unit 53, and decoded in the decoding unit 33. Those pieces of the decoded data can be used in the compression encoding of later target pixel values. In addition, those data are packed into data to adjust its data width to s-bits, being an integral multiple of a unit for accessing (such as 32-bits) to access to the SDRAM 15, and the data can be sent to the SDRAM 15 as the packing data of s-bit length.

Here, mainly, packing of the data in consideration of accessing to the SDRAM 15 will be explained.

One packing data has an s-bit length. Preferably, this bit length s is integral multiple of 8.

In this embodiment, at least one pixel value for each color of pixels is recorded in each packing data as the initial pixel value data. In this example, the pixel values g1 and r1, which are the pixel value data of d(d=12) bit length inputted to the CODEC 13, are recorded as they are, as the initial pixel value data. The class value of m(m=2) bit length indicating the zone quantization width is also recorded in the packing data, and further the compressed encoded pixel value data of the pixel which is included in this zone is recorded as the data of n(n=8) bit length. The number of pixels which are included in one zone, p, satisfies p=4, and hence, pieces of the compressed encoded pixel value data of the pixels G2, R2, G3, and R3 are recorded as the data of 8-bit length, respectively. Further, the class value of the next zone and pieces of the compressed encoded pixel value data of pixels being included in the next zone can also be recorded.

The aforementioned several kinds of data are collected into one packing data so that a total data length of the packing data does not exceed s-bits. When the total data length does not reach s-bits in the packing processing, predetermined dummy data is added to excess bits, and the packing data of s-bits may be prepared. The packing data is sent to the SDRAM 15 and is stored therein.

In the present embodiment, for every packing data, the pixel value data of the pixel of each color recorded first is recorded as the initial pixel value data. This improves convenience in reading the compressed encoded data. When data is read out from the data which is recorded in the SDRAM 15 and constitutes image data of one frame image and if the data being desired to be read out is only a part of the data of pixel values which constitutes the one frame image, the recording methodology mentioned above makes it possible to decode the required pixel values only by reading out the data of s-bit length which includes the data of the required pixel and pixels of its vicinity. Therefore, there is no necessity for reading data of all pixels which constitute one frame image, thus making it possible to realize a high-speed processing and power saving.

When the compressibility of the compressed encoded image data is prioritized over an effect described above, frequency of the pixel value data recorded as the initial pixel value data may be reduced. In this case, the initial pixel value data is not necessarily required to be recorded in one packing data. In addition, in order to improve the compressibility, it is sometimes effective to set the number of the pixels included in one zone, p, larger. Thus, a frequency of appearance of the class value data can be reduced. In addition, it is also effective to set the bit length of the compressed encoded pixel value data, n, smaller.

In addition, the processing with a constant quantization width is also possible. In this case, the class value data indicating the quantization width may not be recorded.

<Decoding in the Decoding Unit 33>

Figure 8B:
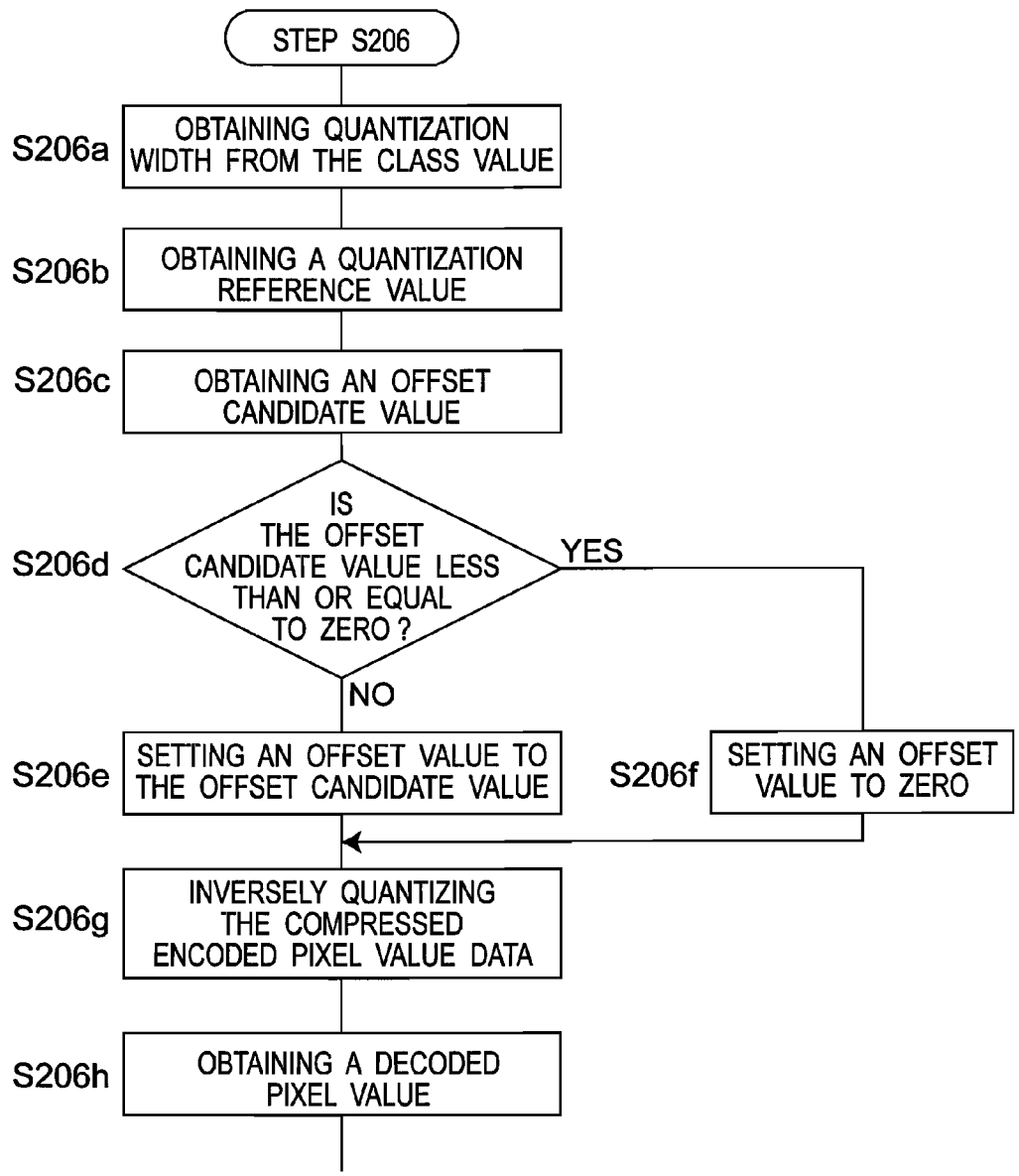
FIG. 8B is a flowchart of decoding processing.

FIGS. 8A and 8B are flowcharts of the processing for the decoding. FIG. 8B is a flowchart showing detailed steps in step S206 of FIG. 8A. With reference to FIGS. 8A and 8B, explanation will be given hereunder to the decoding processing for the compressed encoded data by the decoding unit 33. The unpacking unit 53 inputs each kind of data, namely, the initial pixel value data, the compressed encoded pixel value data, and the class value being individually sent from the packing unit 51, and the packing data, namely, the compressed encoded image data inputted from the SDRAM 15, and, as to the packing data, separates the packing data into individual data (step S201 of FIG. 8A). The separated each kind of data is sent from the unpacking unit 53 to the inverse quantization unit 55 at a predetermined timing.

The data being sent to the inverse quantization unit 55 is subjected to the reversed processing with respect to the processing in the quantization unit 47. The decoded pixel value data is calculated from the compressed encoded pixel value data, and then, the decoded pixel value data is sent to the output unit 57. Specifically, the initial pixel value data is sent to the output unit 57, as it is, as the data of d (=12) bits (steps S202 and S203 of FIG. 8A). In addition, this data is stored temporarily for use in later processing. The data of the class value, which is the quantization width information data, is stored temporarily for use in the decoding processing of later compressed encoded pixel value data (steps S204 and S205 of FIG. 8A). In step S206, the decoding processing is performed and the decoded pixel value data is generated. The quantization width and the quantization reference value are obtained from the class value data (steps S206a and S206b of FIG. 8B). Then, the offset candidate value is obtained, which is a difference between the initial pixel value data being previously processed and the quantization reference value or a difference between the decoded pixel value data and the quantization reference value (step S206c of FIG. 8B). When the offset candidate value is zero or less, the offset value is set to zero (steps S206d, S206e, and S206f of FIG. 8B). The compressed encoded pixel value data is bit shifted (inversely quantized) based on the zone quantization width shown by the class value to generate the inversely quantized pixel value data (step S206g of FIG. 8B). And by obtaining the sum of the inversely quantized pixel value data and the offset value which is a difference between the previously processed initial pixel value data and the quantization reference value obtained from the class value or a difference between the decoded pixel value data and the quantization reference value and the inversely quantized pixel value data, the pixel value data is decoded to a data of d=12 bit length (step S206h of FIG. 8B). Then the decoded data is then sent to the output unit 57 as the decoded pixel value data (step 5206 of FIG. 8A). In the quantization unit 47, rounding up or down is performed in the quantization, however, in the inverse quantization unit 55, only a simple bit shift may be performed.

The decoded pixel value data thus obtained is sent to the encoding unit 31 and the YC processing unit 17 at respective predetermined timings.

When the quantization processing is performed with a constant quantization width, the class value data is not necessary. In this case, the decoding processing may be performed with a given quantization width.

Note that, in this embodiment, the image pickup element having the Bayer array is used. However, the CODEC according to the present invention can be used in combination with the image pickup element having other array, for example, the image pickup element having a primary color vertical stripe array, RGBRGBRGB . . . . Also, the CODEC according to the present invention can be used even in a case that a sensor (pixel) array of the image pickup element is a complementary color checked array, such as having CyYeCyYeCyYe . . . . The CODEC according to the present invention can be used, irrespective of an array format of the pixels in the light receiving unit of the image pickup element. Not only a case that the pixel array is a tetragonal lattice array, but also a case that the array format of the pixels is a honeycomb-like array, the CODEC according to the present invention can be used.

Embodiment 2

<CODEC with Feedback Processing of Error Due to Quantization>

This embodiment provides a digital still camera (DSC) provided with a CODEC 113 having error feedback processing for reducing an error. This error often occurs in the quantization of the pixel value data by the CODEC (a difference between the pixel value data and the decoded pixel value data obtained through applying compression encoding processing to the pixel value data and further applying the decoding processing to the encoded pixel value data).

The DSC of this embodiment is similar to the DSC 1 according to the first embodiment except for the processing by the CODEC 113. According to FIG. 1, it is appropriate to consider that the CODEC 113 as will be explained hereunder is mounted on the DSC of this embodiment instead of the CODEC 13. Here, the configuration and processing of the CODEC 113 will be explained. A part not described in particular may be the same as that of the first embodiment.

Figure 9:
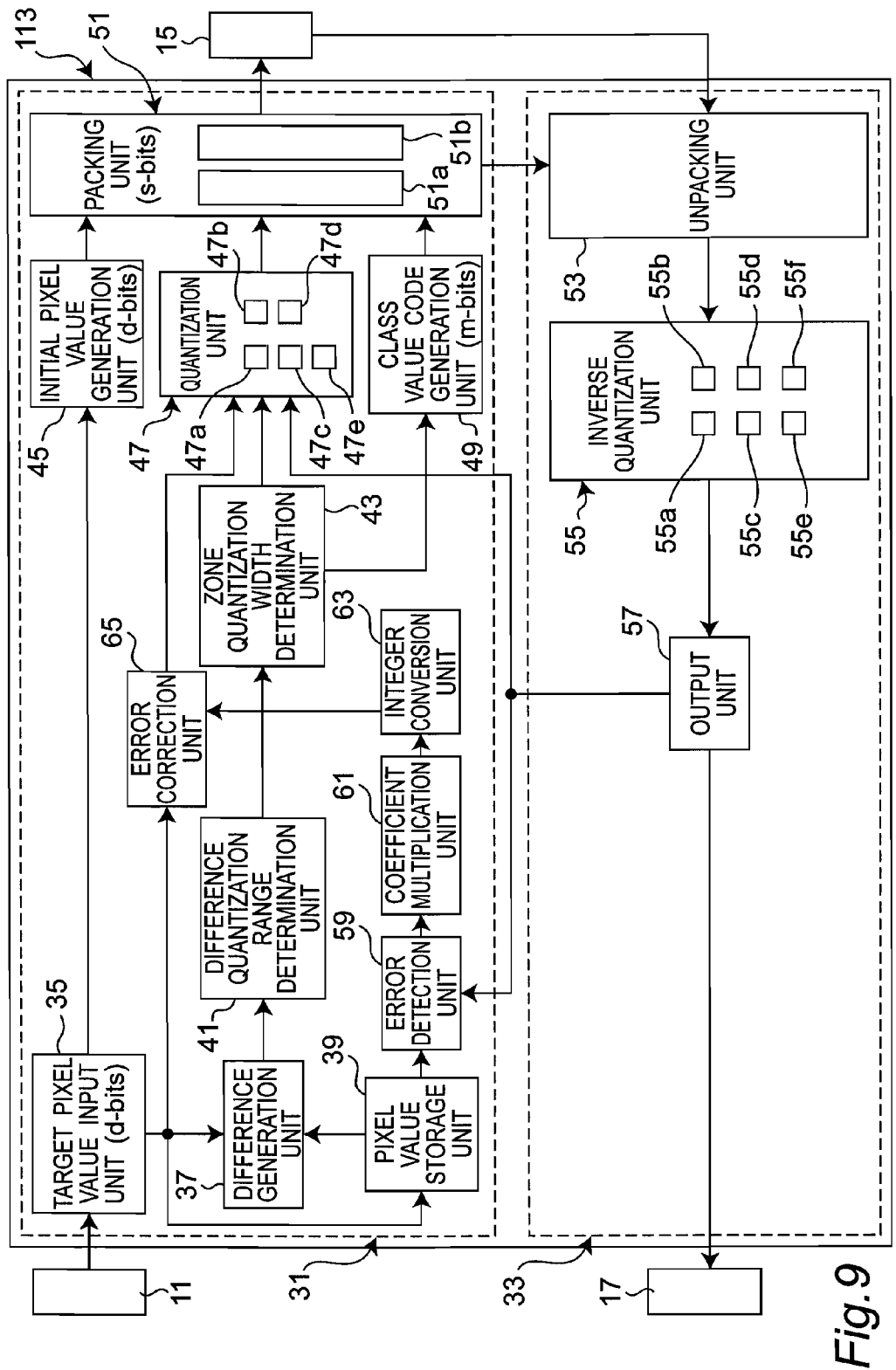
FIG. 9 is a block diagram of a CODEC 113 according to a second embodiment.

FIG. 9 is a block diagram of the CODEC 113 according to this embodiment. The CODEC 113 is different from the CODEC 13 according to the first embodiment in the point that an error detection unit 59, a coefficient multiplication unit 61, an integer conversion unit 63, and an error correction unit 65 are added to the encoding unit 31, and the point that the output of the output unit 57 of the decoding unit 33 is inputted to the error detection unit 59 and the quantization unit 47.

The error feedback processing by the CODEC 113 will be explained hereunder. Here, the error feedback processing in the quantization of the pixel value r3 of the pixel R3 is taken as a specific example.

The pixel value r3 is inputted from the ADC 11 to the target pixel value input unit 35, which is similar to the processing in the first embodiment. The pixel value r3 is a pixel value data to be subjected to the compression encoding processing and then be recorded as the compressed encoded pixel value data. Therefore, the pixel value r3 is sent to a difference generation unit 37. At the same time, the pixel value r2, being the left side nearby same color pixel value of the target pixel value r3, is sent from the storage unit 39 to the difference generation unit 37. The difference value Δr3=r3−r2 is obtained. A difference quantization range of the pixel R3 is obtained. The zone quantization width is determined based on the difference quantization range of the pixels being included in the same zone as that of the pixel R3 by the zone quantization width determination unit 43. Then, the zone quantization width thus determined is sent to the quantization unit 47.

For the quantization of the pixel value r3 in the quantization unit 47, the target pixel value r3 and the left side nearby same color pixel value r2 are necessary as well as the aforementioned zone quantization width. In this embodiment, an error corrected target pixel value Cr3 processed in the error correction unit 65 is inputted to the quantization unit 47 in place of the target pixel value r3. In addition, a decoded pixel value is used as a left side nearby same color pixel value in the quantization of the pixel value r3.

According to the table 2, the pixel value r2 is &D(50). Meanwhile, the decoded pixel value is &D(52). In the CODEC 113 of this embodiment which uses the decoded pixel value as the left side nearby same color pixel value for quantization, the error which has occurred in the quantization of the pixel value of a preceding pixel has an influence on the quantization of the pixel value of later same color pixel. The error feedback processing of the CODEC 113 as will be described hereunder is executed for the purpose of reducing such influence.

The decoded pixel value being outputted from the output unit 57 of the decoding unit 33 is sent to the error detection unit 59 of the encoding unit 31. The pixel value r2 being recorded in the storage unit 39 is also inputted to the error detection unit 59 with a matched timing to calculate an error. Here, the error Er2 which is an error between the pixel value r2 (true value) and the decoded pixel value are obtained from the difference between the true pixel value and the decoded pixel value. That is, Er2=(true pixel value)−(decoded pixel value)=(−2).

The error Er2 with respect to the pixel value r2 is sent to the coefficient multiplication unit 61. A value αEr2 is obtained by multiplying the error by a coefficient α, namely, α·Er2 (=αEr2). The coefficient α may be a value obtained from an experiment.

In this example, α is set to be 0.50 for simplification. In this example, hence, the αEr2 is (−1.00). Generally, α is a real number obtained from an experiment, and therefore, a decimal fraction part appears in the error αEr2, which is the product of Er2 and α. Hence, the integer conversion unit 63 converts the real number αEr2 into an integer, so that the integer value thus obtained is set as the error correction value. An integer conversion processing by the integer processing unit 63 may be a general processing. For example, the processing such as rounding-down of the fraction part, rounding-off of the first order of the fraction part, or rounding-up of the fraction may be performed. In this example, the error correction value is (−1).

Next, the processing in the error correction unit 65 will be explained. The target pixel value r3 and the error correction value for the pixel value r3, (−1) are inputted to the error correction unit 65. Here, the error correction value is given to the target pixel value as a negative feedback. That is, the error corrected target pixel value Cr3 is equal to the value obtained by subtracting the error correction value from the target pixel value. That is, Cr3=r3−(−1)=r3+1. The error corrected target pixel value Cr3 is inputted to the quantization unit 47 and is then quantized based on the decoded pixel value Dr2 and the zone quantization width. The quantized value is outputted to the packing unit 51 as the compressed encoded pixel value data.

The processing in the quantization unit 47 may be similar to that of the first embodiment. A value for the zone quantization width is determined on the basis of the difference value between the target pixel value and the left side nearby same color pixel value which is stored in the storage unit 39 and does not include an error. The error corrected target pixel value which is corrected by the error correction unit 65 is used for the target pixel value. As the left side nearby same color pixel value in the quantization unit 47, the decoded pixel value data which has been subjected to the compression encoding processing and further subjected to the decoding processing is used.

Embodiment 3

<Use of a Variable Bit Length Compressed Encoded Pixel Value Data Based on a Distribution Ratio>

This embodiment provides a digital still camera (DSC) of which CODEC is capable of changing and optimizing the bit length of the compressed encoded pixel value data (the number of bits of the compressed encoded pixel value data), which is the compression encoding value of the pixel value data, according to the characteristic of an object which is actually imaged. The present embodiment provides the CODEC 213 having further higher compression efficiency. The DSC of this embodiment is similar to the DSC of the first and second embodiments, except for the processing in the CODEC 213. According to FIG. 1, it is appropriate to consider that the CODEC 213 as will be explained hereunder is mounted on the DSC of this embodiment instead of the CODEC 13. Here, the configuration and processing of the CODEC 213 will be explained. A part not described in particular may be the same as that of the first embodiment. The CODEC 213 of the present embodiment performs an optimal bit length of the compressed encoded pixel value data etc. determination processing. The optimal bit length of the compressed encoded pixel value data etc. determination processing determines the optimal number of bits of compressed encoded pixel value data, quantization width, and the like on the basis of optical information with respect to the object, which has entered the image pickup element before the moment when an image pickup instruction is given (the moment when a shutter button is pressed by an operator).

<Configuration of CODEC 213>

Figure 10:
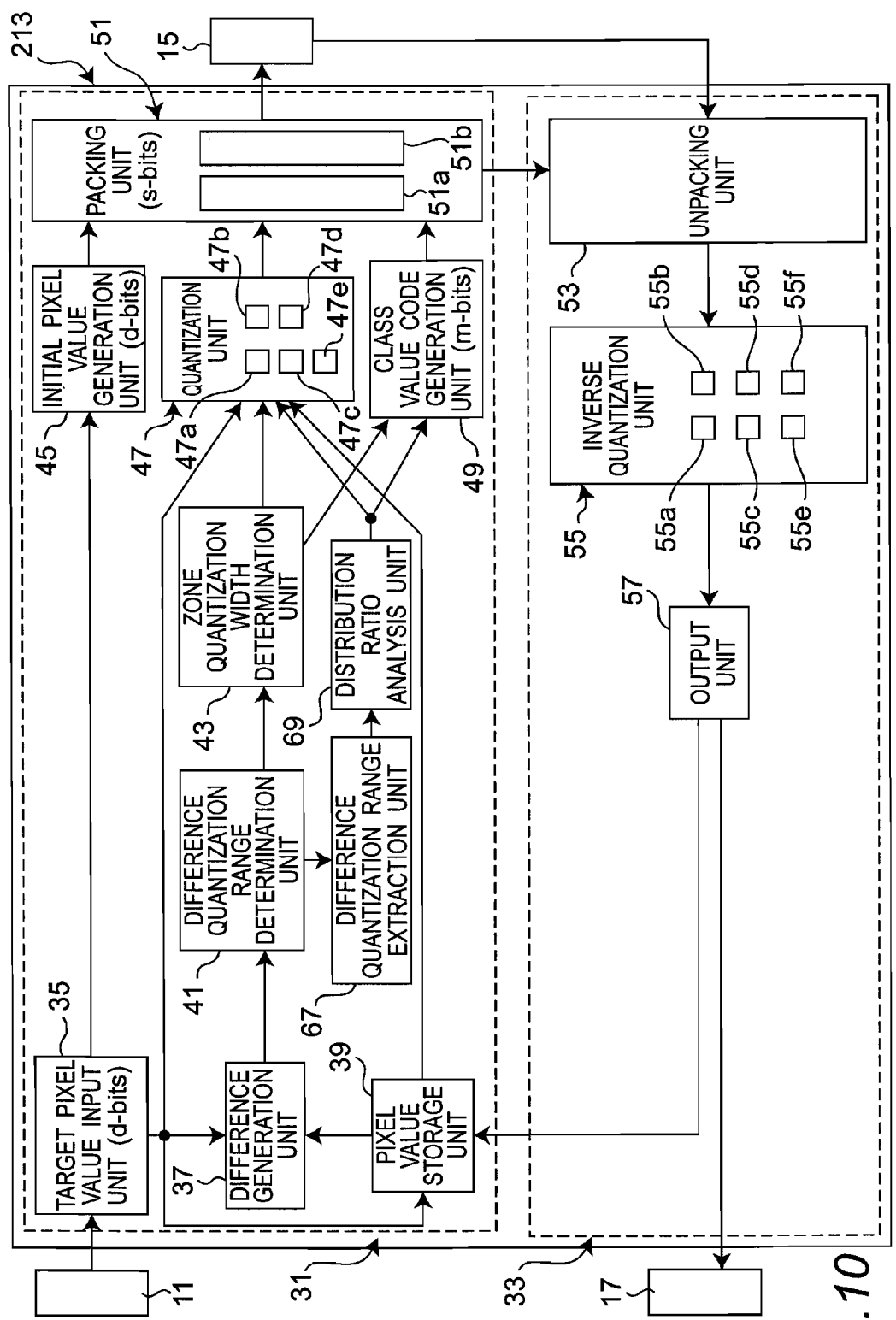
FIG. 10 is a block diagram of a CODEC 213 according to a third embodiment.
Figure 11:
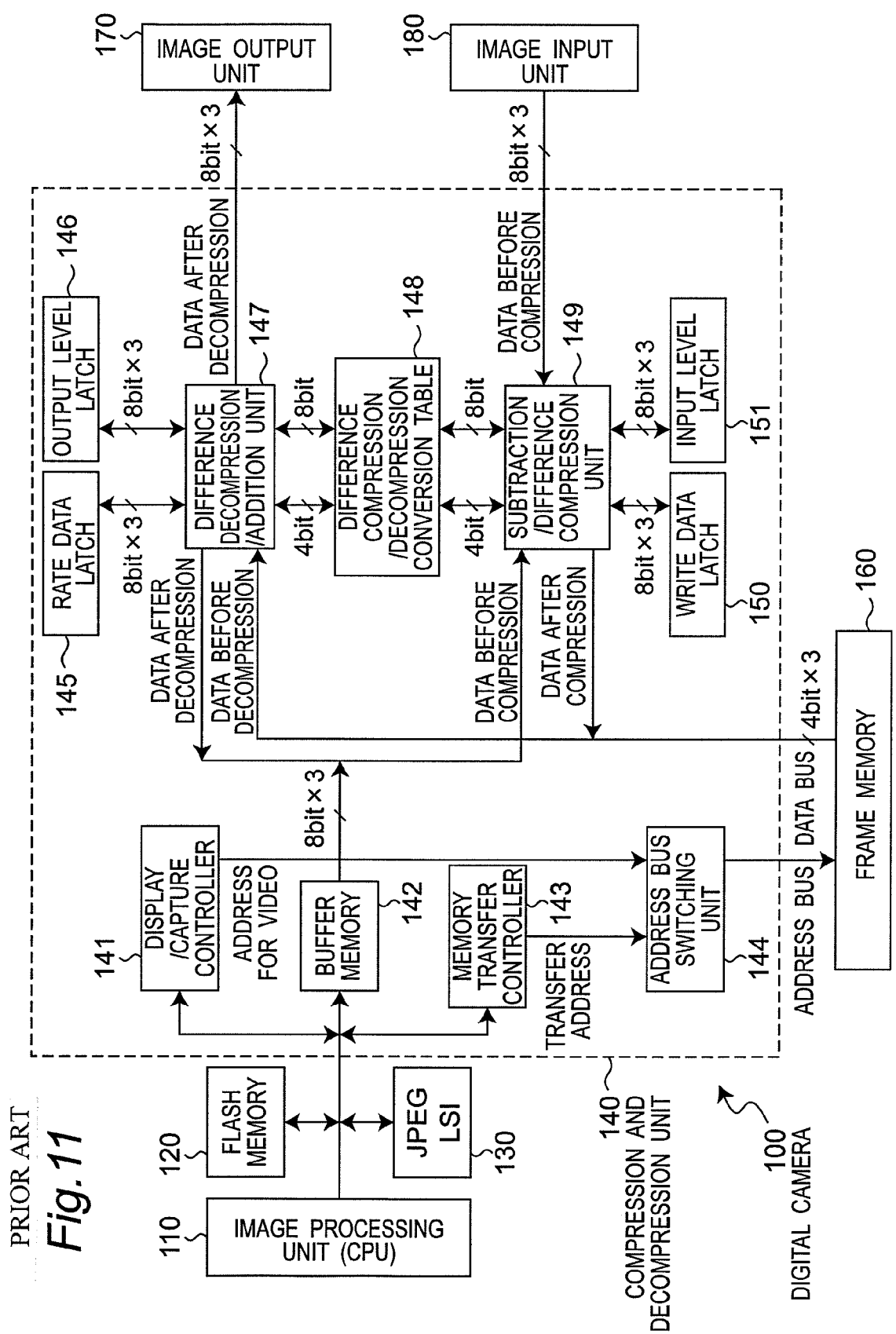
FIG. 11 is a block diagram of a configuration of a digital still camera disclosed in Patent Document 1.
Figure 12:
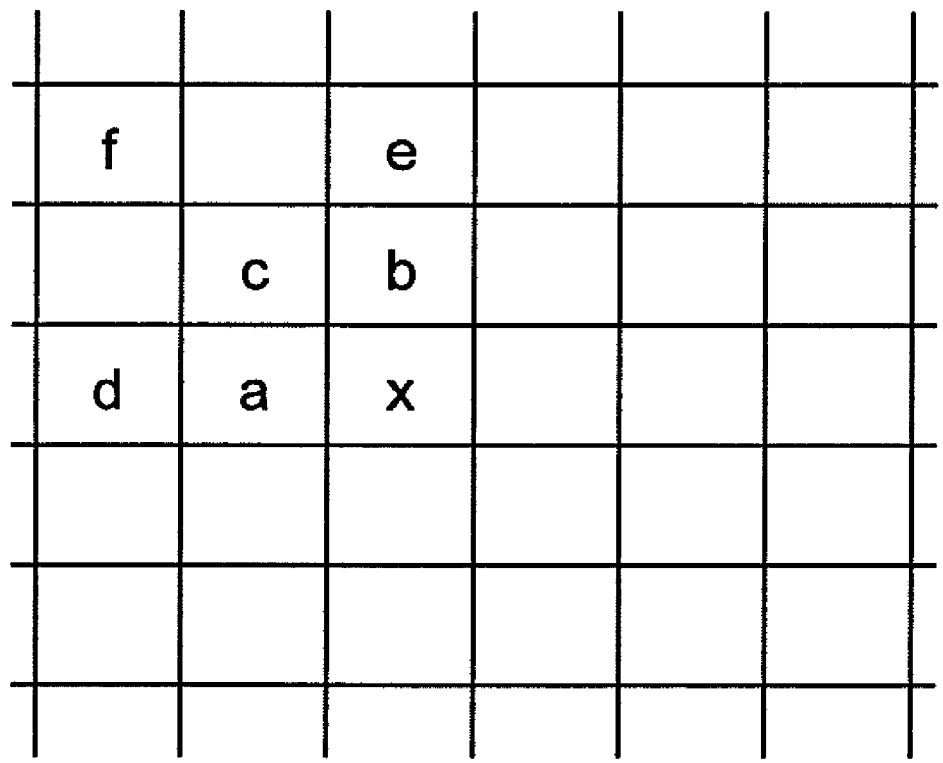
FIG. 12 is a partial schematic view of a single board CCD.
Figure 13:
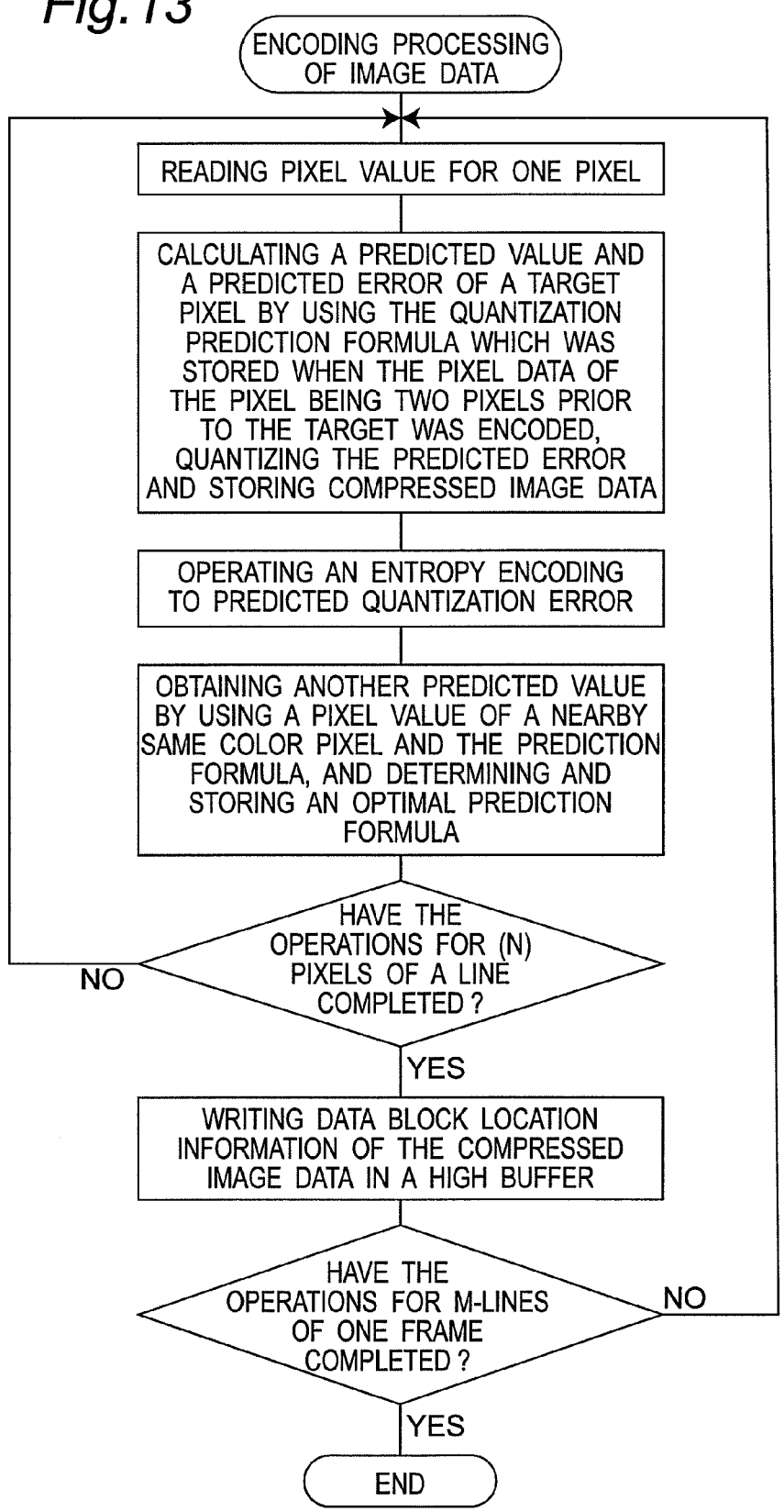
FIG. 13 is a flowchart of a digital signal compression encoding method disclosed in Patent Document 2.
Figure 14:
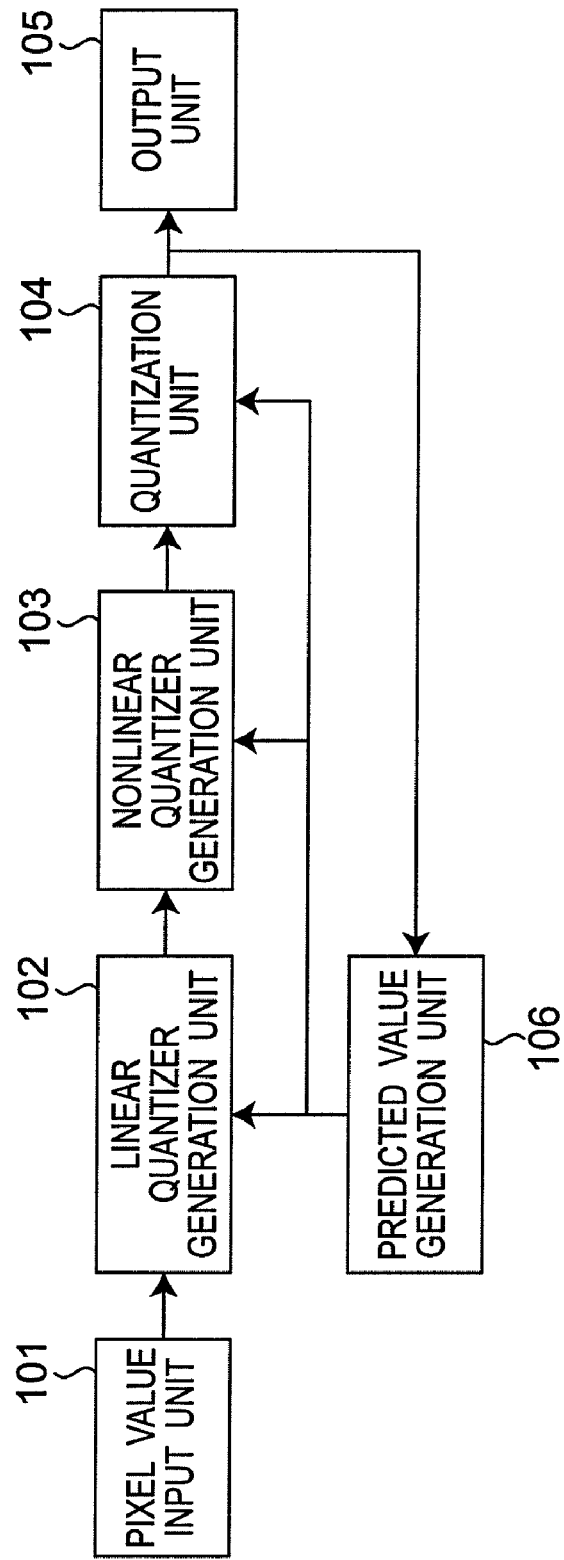
FIG. 14 is a block diagram of an image encoding device disclosed in Patent Document 3.

FIG. 10 is a block diagram of the CODEC 213 according to the present embodiment. The CODEC 213 is different from the CODECs 13 and 113 according to the first and second embodiments in the point that a difference quantization range extraction unit 67 and a distribution ratio analysis unit 69 are added into the encoding unit 31. Regarding the other configurations, the same configuration as the CODEC 13 or the CODEC 113 may be provided to the CODEC 213. That is, FIG. 9 shows that the CODEC 213 has a similar configuration as that of the CODEC 13 except for the aforementioned point. However, the CODEC 213 may have the similar configuration as that of the CODEC 113 except for the aforementioned point.

The difference quantization range extraction unit 67 inputs the output from the difference quantization range determination unit 41, namely, the quantization range of each pixel difference value, and stores the input temporarily therein. A plurality of quantization ranges stored in the extraction unit 67 is outputted to the distribution ratio analysis unit 69 at a predetermined timing.

The distribution ratio analysis unit 69 analyzes the quantization ranges of thinned pixels which correspond to one frame image, and determines the optimal number of bits of the compressed encoded pixel value data. The optimal number of bits (t [bit]) of the compressed encoded pixel value data being thus determined is sent to the quantization unit 47 and the class value code generation unit 49.

In the quantization unit 47, the compressed encoded pixel value data of t-bit length is generated. The class value code generation unit 49 generates a class value code of m-bits expressing the zone quantization width being inputted from the zone quantization width determination unit 43 and the optimal number of bits of the compressed encoded pixel value data, which is then outputted to the packing unit 51. The class value in the present embodiment may be generated according to a predefined conversion rule so as to include the optimal number of bits of the compressed encoded pixel value data.

<Processing of Determining the Optimal Number of Bits of the Compressed Encoded Pixel Value Data in the CODEC 213>

The DSC 1 has an operation mode called a "monitor" mode. The monitor mode is a mode of operation in which the optical information (such as an object image) being incident to the image pickup element 5 is displayed on the display unit 27, for example, so that an operator can decide an object to wait for a timing to click a shutter. In the monitor mode, the DSC1 operates processing only to the pixels of predetermined ratio, instead of extracting accumulated charges of all pixels of the image pickup element 5 and applying signal processing to all extracted accumulated charges. Such image pickup element drive mode is called a draft mode or a thinning mode. That is, in the monitor mode, the DSC 1 drives the image pickup element 5 in the draft mode. The DSC 1 responds to a shutter button operation by the operator and switches the image pickup element drive mode from the draft mode to an all pixel drive mode, so that imaging is performed.

In the monitor mode, the CODEC 213 inputs pixel values in the draft mode, that is, the CODEC 213 inputs the thinned number of pixel values. Thinning of the pixels is performed in a predetermined pattern, and therefore, the left side nearby same color pixel value with respect to the target pixel value in the draft mode can be defined in accordance with a predetermined rule, although the rule has to be modified from the rule at the imaging. In the difference generation unit 37, the difference value is calculated for each target pixel value by using the left side nearby same color pixel value with respect to the target pixel value thus defined, and the difference quantization range determination unit 41 determines the difference quantization range with respect to each target pixel value. The difference quantization range thus determined is sent to the difference quantization range extraction unit 67.

The difference quantization range extraction unit sends the difference quantization ranges for a recent one frame image to the distribution ratio analysis unit 69, utilizing the difference quantization ranges for each target pixel which is temporarily stored.

<Processing in the Distribution Ratio Analysis Unit 69>

The distribution ratio analysis unit 69 analyzes the difference quantization ranges having received and determines the optimal number of bits of the compressed encoded pixel value data.

The optimal number of bits of the compressed encoded pixel value data is the bit length of the compressed encoded pixel value data which is generated by the CODEC 213 for recording the pickup image in the SDRAM 15 as compressed encoded data. In the first and second embodiments, this bit length n is fixed at 8-bit. However, in some cases, a sufficient image quality can be obtained with the bit length being set shorter than 8-bit length, depending on the object to be imaged. Therefore, in this embodiment, an optimal bit length is determined based on object information which has been retrieved in the monitor mode.

First, the distribution ratio analysis unit 69 analyzes the difference quantization ranges of the recent one frame image including the object, and obtains an appearance distribution of the difference quantization ranges. Then, for example, the distribution ratio analysis unit 69 obtains the distribution ratios of the difference quantization range each included in the value which is less than or equal to the natural number (n−1(=8−1=7), namely, a natural number v, v−1, v−2, or, . . . . From those distribution ratios, a maximum difference quantization range w of which distribution ratio is greater than or equal to a predetermined threshold value is obtained. The number obtained by adding 1 to the maximum difference quantization range w is set as the optimal number of bits of the compressed encoded pixel value data, which is then sent to the quantization unit 47 and the class value code generation unit 49.

For example, when the appearance ratio of the difference quantization range having the value of 4 or less is a predetermined ratio (90%, for example) with respect to all quantization range, it can be estimated that about the 90% of the pieces of the pixel value data can be recorded without rounding by the quantization unit 47 using the data of 4+1=5-bit length. It is disadvantageous in an aspect of the compressibility, for such an object, to assign 8-bit length to the number of bits of each compressed encoded pixel value data. In such case, the CODEC 213 is capable of improving the compressibility without quality deterioration. In such case, the quantization unit 47 outputs compressed encoded pixel value data which has 5-bit length for each target pixel value. As to class value, the class value having the information regarding the optimal number of bits of the compressed encoded pixel value data is generated. Therefore, in decoding in the decoding unit 33, the number of bits of each compressed encoded pixel value data is determined based on the class value, and decoding processing similar to the foregoing embodiment can be performed.

Note that in the distribution ratio analysis unit 69, instead of analyzing the difference quantization range of the recent one frame image, only a part of the image, for example an important part or a central region in the image is analyzed and the optimal number of bits of the compressed encoded pixel value data may be determined.

In addition, in the former example, although the predetermined ratio is set to 90%, a ratio of any of 1 to 100% may be used as a threshold value. Further, by examining the characteristic of the object, and based on the result of such examination, the threshold value may be determined flexibly for each imaging processing.

In addition, the difference quantization ranges being included in one frame image may be divided into a plurality of blocks and, in each block, the optimal number of bits of the compressed encoded pixel value data may be determined. In this case, the data of different bit lengths is mixed in the compressed encoded pixel value data of one frame image. However, the class values are stores such variation of the numbers of bits of these compressed encoded pixel value data. Therefore, correct decoding is possible in the decoding unit 33.

In addition, even in the monitor mode, the image pickup element 5 may be driven in an all pixels driving mode.

In addition, in all embodiments of the present invention, a function for storing or temporarily storing data may be realized by using not only a storing element but also the known delay circuit.

INDUSTRIAL APPLICABILITY

The present invention can be employed in a general electronic apparatus or a general video apparatus which have a CCD sensor or an MOS sensor. Those apparatuses are considered to be further broadly used hereafter. The present invention can compress a data volume with giving almost no damage to an image quality, despite having a simple structure.

By reducing the number of bits of recorded data, a use amount of a memory and an access amount of a memory can be reduced, and a cost and power consumption can also be reduced.

The present invention is expected to be used in further purposes in the digital still camera and a camera for photographing a moving image.

The invention claimed is:

1. A digital data encoding device which receives pixel value data in a digital format indicating a signal from a light receiving unit in which at least a pixel for sensing a first color and a pixel for sensing a second color are periodically arranged, and processes the pixel value data, comprising:
    a difference generation unit that outputs a difference value between first pixel value data from a first pixel which senses a first color and second pixel value data from a second pixel which senses the first color being positioned in a vicinity of the first pixel as a first pixel difference value, and outputs a difference value of third pixel value data from a third pixel which senses a second color and fourth pixel value data from a fourth pixel which senses the second color being positioned in a vicinity of the third pixel as a second pixel difference value;
    a quantization reference value determination unit that obtains a maximum value between an absolute value of the first pixel difference value and an absolute value of the second pixel difference value as a maximum pixel value difference, and determines a value being greater than or equal to the obtained maximum pixel value difference as a quantization reference value;
    an offset value setting unit that sets a difference between the first pixel value data and the quantization reference value as a first offset value and sets a difference between the third pixel value data and the quantization reference value as a second offset value;
    a value to be quantized setting unit that sets a difference between the second pixel value data and the first offset value as a first value to be quantized and sets a difference between the fourth pixel value data and the second offset value as a second value to be quantized; and
    a quantization unit that quantizes the first value to be quantized and the second value to be quantized and obtains first compressed encoded pixel value data and second compressed encoded pixel value data.

2. The digital data encoding device according to claim 1, wherein the first color and the second color are different from each other.

3. The digital data encoding device according to claim 1, further comprising an offset value zero resetting unit that, when at least one of the first and second offset values is less than or equal to zero, resets said at least one of the first and second offset values to zero.

4. The digital data encoding device according to claim 1, further comprising a quantization width determination unit that determines a quantization width of the quantization.

5. The digital data encoding device according to claim 4, wherein the quantization width is increased as the maximum pixel value difference becomes larger.

6. The digital data encoding device according to claim 4, comprising a quantization width information data generation unit that encodes the determined quantization width into a code of m-bit length, the m being a natural number.

7. The digital data encoding device according to claim 6, wherein the m is 2.

8. The digital data encoding device according to claim 6, further comprising a compressed encoded image data generation unit,
    wherein said compressed encoded image data generation unit generates compressed encoded image data of s-bit length, the s being a natural number, including at least one of the quantization width information data, the first compressed encoded pixel value data, and the second compressed encoded pixel value data and, the s being a multiple of 8.

9. The digital data encoding device according to claim 8, wherein said compressed encoded image data generation unit records the first pixel value data as they are in the compressed encoded image data as initial pixel value data.

10. The digital data encoding device according to claim 4, wherein said quantization width determination unit determines the quantization width to any one of preliminarily determined plural quantization widths.

11. The digital data encoding device according to claim 10, wherein the number of the plural quantization widths is less than or equal to m-th power of 2.

12. The digital data encoding device according to claim 10, wherein said quantization width determination unit obtains a maximum value between the numbers of digits required for an unsigned integer binary value notation of each of the first pixel difference value and the second pixel difference value so as to determine the quantization width from the plural quantization widths.

13. A digital data decoding device, comprising:
a compressed encoded image data input unit that inputs compressed encoded image data of s-bit lengths, the s being a natural number, which has an initial pixel value data part in which first pixel value data of a first pixel which senses a first color are recorded as they are as first initial pixel value data and a compressed encoded pixel value data part in which first compressed encoded pixel value data indicating second pixel value data of a second pixel which senses the first color being positioned in a vicinity of the first pixel are recorded;
an offset value setting unit that obtains a difference between the first initial pixel value data and a first quantization reference value being set as a first offset value;
an inverse quantization unit that inversely quantizes the first compressed encoded pixel value data by using a first quantization width being set to obtain first inversely quantized pixel value data; and
a decoded pixel value generation unit that obtains a sum of the first inversely quantized pixel value data and the first offset value to generate first decoded pixel value data;
wherein the first quantization reference value has a value equal to or greater than a maximum value between i) an absolute value of a difference value between the first pixel value data and the second pixel value data and ii) an absolute value of a difference value between a third pixel value data and a fourth pixel value data, wherein the third pixel value data is from a third pixel which senses a second color and the fourth pixel value data is from a fourth pixel which senses the second color being positioned in a vicinity of the third pixel;
said value being equal to the reference value used when generating the first compressed encoded pixel value data from the second pixel value data.

14. The digital data decoding device according to claim 13, wherein:
the third pixel value data of the third pixel which senses the second color being positioned nearby the first pixel is further recorded as they are as second initial pixel value data in the initial pixel value data part;
second compressed encoded pixel value data which indicates the fourth pixel value data of the fourth pixel which senses the second color being positioned in the vicinity of the third pixel is further recorded in the compressed encoded pixel value data part;

said offset value setting unit obtains a difference between the second initial pixel value data and the first quantization reference value as a second offset value;
said inverse quantization unit further inversely quantizes the second compressed encoded pixel value data by using the first quantization width so as to obtain second inversely quantized pixel value data; and
said decoded pixel value generation unit further obtains a sum of the second inversely quantized pixel value data and the second offset value to generate second decoded pixel value data.

15. The digital data decoding device according to claim 14, wherein:
third compressed encoded pixel value data indicating fifth pixel value data of a fifth pixel which senses the first color being positioned in a vicinity of the second pixel and being nearby the fourth pixel is further recorded in the compressed encoded pixel value data part;
said offset value setting unit further obtains a difference between the first decoded pixel value data and second quantization reference value being set as a third offset value;
said inverse quantization unit further inversely quantizes third compressed encoded pixel value data by using a second quantization width being set to obtain third inversely quantized pixel value data; and
said decoded pixel value generation unit further obtains a sum of the third inversely quantized pixel value data and the third offset value to generate third decoded pixel value data.

16. The digital data decoding device according to claim 15, wherein the compressed encoded image data includes a quantization width information data part in which at least one of first quantization width information data having information regarding the first quantization width and second quantization width information data having information regarding the second quantization width is recorded.

17. The digital data decoding device according to claim 16, further comprising a quantization width setting unit that sets a quantization width of the inverse quantization to any one of preliminarily determined plural quantization widths,
wherein said quantization width setting unit sets the first quantization width and the second quantization width to each one of the plural quantization widths, based on the first quantization width information data and the second quantization width information data.

18. The digital data decoding device according to claim 17, further comprising a quantization reference value setting unit that sets a quantization reference value of the inverse quantization to any one of preliminarily determined plural quantization reference values,
wherein said quantization reference value setting unit sets the first quantization reference value and the second quantization reference value, based on the first quantization width information data and the second quantization width information data.

19. The digital data decoding device according to claim 18, wherein the first quantization width information data and the second quantization width information data are pieces of data of m-bit lengths, the m being a natural number.

20. The digital data decoding device according to claim 19, wherein the numbers of the plural quantization widths and the plural quantization reference values are less than or equal to the m-th power of 2.

21. The digital data decoding device according to claim 19, wherein the m is 2.

22. The digital data decoding device according to claim 14, wherein the first color and the second color are different from each other.

23. The digital data decoding device according to claim 13, further comprising an offset value zero resetting unit that resets the offset value to zero when the offset value being defined by the offset value setting unit is less than or equal to zero.

24. A digital data encoding method, for receiving pixel value data in a digital format indicating a signal from a light receiving unit in which at least a pixel for sensing a first color and a pixel for sensing a second color are periodically arranged and processing the pixel value data, comprising:

generating and outputting a difference value between first pixel value data of a first pixel which senses a first color and second pixel value data of a second pixel which senses the first color being positioned in a vicinity of the first pixel as a first pixel difference value and generating and outputting a difference value between third pixel value data of a third pixel which senses a second color and fourth pixel value data of a fourth pixel which senses the second color being positioned in a vicinity of the third pixel as a second pixel difference value;

obtaining a maximum value between an absolute value of the first pixel difference value and an absolute value of the second pixel difference value as a maximum pixel value difference, determining a value being greater than or equal to the obtained maximum pixel value difference, and determining the value as a quantization reference value;

setting a difference between the first pixel value data and the quantization reference value as a first offset value and setting a difference between the third pixel value data and the quantization reference value as a second offset value;

setting a difference between the second pixel value data and the first offset value as a first value to be quantized and setting a difference between the fourth pixel value data and the second offset value as a second value to be quantized; and quantizing the first value to be quantized and the second value to be quantized to obtain first compressed encoded pixel value data and second compressed encoded pixel value data.

25. A digital data decoding method, comprising:

inputting compressed encoded image data of s-bit lengths, the s being a natural number, which has an initial pixel value data part in which first pixel value data of a first pixel which senses a first color are recorded as they are as first initial pixel value data and a compressed encoded pixel value data part in which first compressed encoded pixel value data indicating second pixel value data of a second pixel which senses the first color being positioned in a vicinity of the first pixel are recorded;

obtaining a difference between the first initial pixel value data and first quantization reference value being set as a first offset value;

inversely quantizing the first compressed encoded pixel value data by using first quantization width being set to obtain first inversely quantized pixel value data; and obtaining a sum of the first inversely quantized pixel value data and the first offset value to generate first decoded pixel value data;

wherein the first quantization reference value has a value equal to or greater than a maximum value between i) an absolute value of a difference value between the first pixel value data and the second pixel value data and ii) an absolute value of a difference value between a third pixel value data and a fourth pixel value data, wherein the third pixel value data is from a third pixel which senses a second color and the fourth pixel value data is from a fourth pixel which senses the second color being positioned in a vicinity of the third pixel;

said value being equal to the reference value used when generating the first compressed encoded pixel value data from the second pixel value data.

* * * * *